United States Patent
Caspall et al.

(10) Patent No.: US 12,085,644 B2
(45) Date of Patent: *Sep. 10, 2024

(54) SONAR BEAM SHAPE CONTROLLING HORN

(71) Applicant: Navico, Inc., Tulsa, OK (US)

(72) Inventors: Jayme J. Caspall, Tulsa, OK (US); Bin Gao, Wilmington, NC (US); Andrew Chambers, Broken Arrow, OK (US)

(73) Assignee: NAVICO, INC., Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,684

(22) Filed: May 3, 2023

(65) Prior Publication Data
US 2023/0273313 A1 Aug. 31, 2023

Related U.S. Application Data

(63) Continuation of application No. 17/352,515, filed on Jun. 21, 2021, now Pat. No. 11,681,044.

(51) Int. Cl.
*G01S 15/89* (2006.01)
*G01S 7/52* (2006.01)
(Continued)

(52) U.S. Cl.
CPC .......... *G01S 15/89* (2013.01); *G01S 7/52003* (2013.01); *G10K 11/025* (2013.01); *G10K 11/346* (2013.01)

(58) Field of Classification Search
CPC ... G01S 15/89; G01S 7/52003; G10K 11/025; G10K 11/346
See application file for complete search history.

(56) References Cited

U.S. PATENT DOCUMENTS

| 6,842,401 B2 | 1/2005 | Chiang et al. |
| 7,652,952 B2 | 1/2010 | Betts et al. |

(Continued)

FOREIGN PATENT DOCUMENTS

| AU | 2005271581 B9 | 1/2011 |
| DE | 10 2009 051237 A1 | 5/2010 |

(Continued)

OTHER PUBLICATIONS

"PANOPTIX™ All-Seeing Sonar;" retrieved Dec. 1, 2020 from https://explore.garmin.com/en-US/panoptix/.

(Continued)

*Primary Examiner* — Isam A Alsomiri
*Assistant Examiner* — Abdallah Abulaban
(74) *Attorney, Agent, or Firm* — Nelson Mullins Riley & Scarborough LLP

(57) ABSTRACT

A system for reforming sonar emissions from a sonar transducer element or an array of sonar transducer elements is provided. The system comprises the sonar transducer element or the array of sonar transducer elements. The sonar transducer element or the array of sonar transducer elements define an emitting face and are configured to transmit sonar signals along path(s). The system also comprises a horn comprising surface(s). Surface(s) are positioned adjacent to or in a spaced apart manner from the emitting face of the sonar transducer element or the array of sonar transducer elements so that the surface(s) are positioned at least partially in path(s) such that at least some of the sonar signals transmitted from the sonar transducer element or the array of sonar transducer elements are redirected based on interaction of the at least some of the sonar signals and surface(s).

20 Claims, 33 Drawing Sheets

(51) Int. Cl.
  *G10K 11/02*  (2006.01)
  *G10K 11/34*  (2006.01)

(56) References Cited

U.S. PATENT DOCUMENTS

| | | | |
|---|---|---|---|
| 7,961,552 B2 | 6/2011 | Boucher et al. | |
| 8,300,499 B2 | 10/2012 | Coleman et al. | |
| 8,450,907 B2 | 5/2013 | Moon et al. | |
| 8,780,674 B2 | 7/2014 | Mosca et al. | |
| 8,989,974 B2 | 3/2015 | Arnold et al. | |
| 9,872,100 B2* | 1/2018 | Henry | H04R 1/30 |
| 10,144,138 B2 | 10/2018 | Balas et al. | |
| 10,919,075 B2 | 2/2021 | Mosca et al. | |
| 2011/0069856 A1* | 3/2011 | Blore | G10K 11/025 |
| | | | 381/338 |
| 2019/0091882 A1 | 3/2019 | Balas et al. | |
| 2019/0265354 A1 | 8/2019 | Antao | |
| 2020/0072953 A1* | 3/2020 | Wigh | G01S 15/89 |
| 2021/0132204 A1 | 5/2021 | Caspall | |
| 2021/0270963 A1 | 9/2021 | Caspall | |

FOREIGN PATENT DOCUMENTS

| | | | |
|---|---|---|---|
| EP | 2367640 B1 | | 1/2019 |
| JP | 2009021852 A | * | 1/2009 |
| WO | WO 2021/106138 A1 | | 6/2021 |
| WO | WO 2013/036284 A1 | | 3/2023 |

OTHER PUBLICATIONS

"Blue View DP900 90 Fish Measurement;" YouTube; Apr. 7, 2009; retrieved Dec. 1, 2020 from https://www.youtube.com/watch?y=qQyeAi4bi7Q.

Aris Explorer; *Sound Metrics*; retrieved Dec. 1, 2020 from http://www.soundmetrics.com/.

* cited by examiner

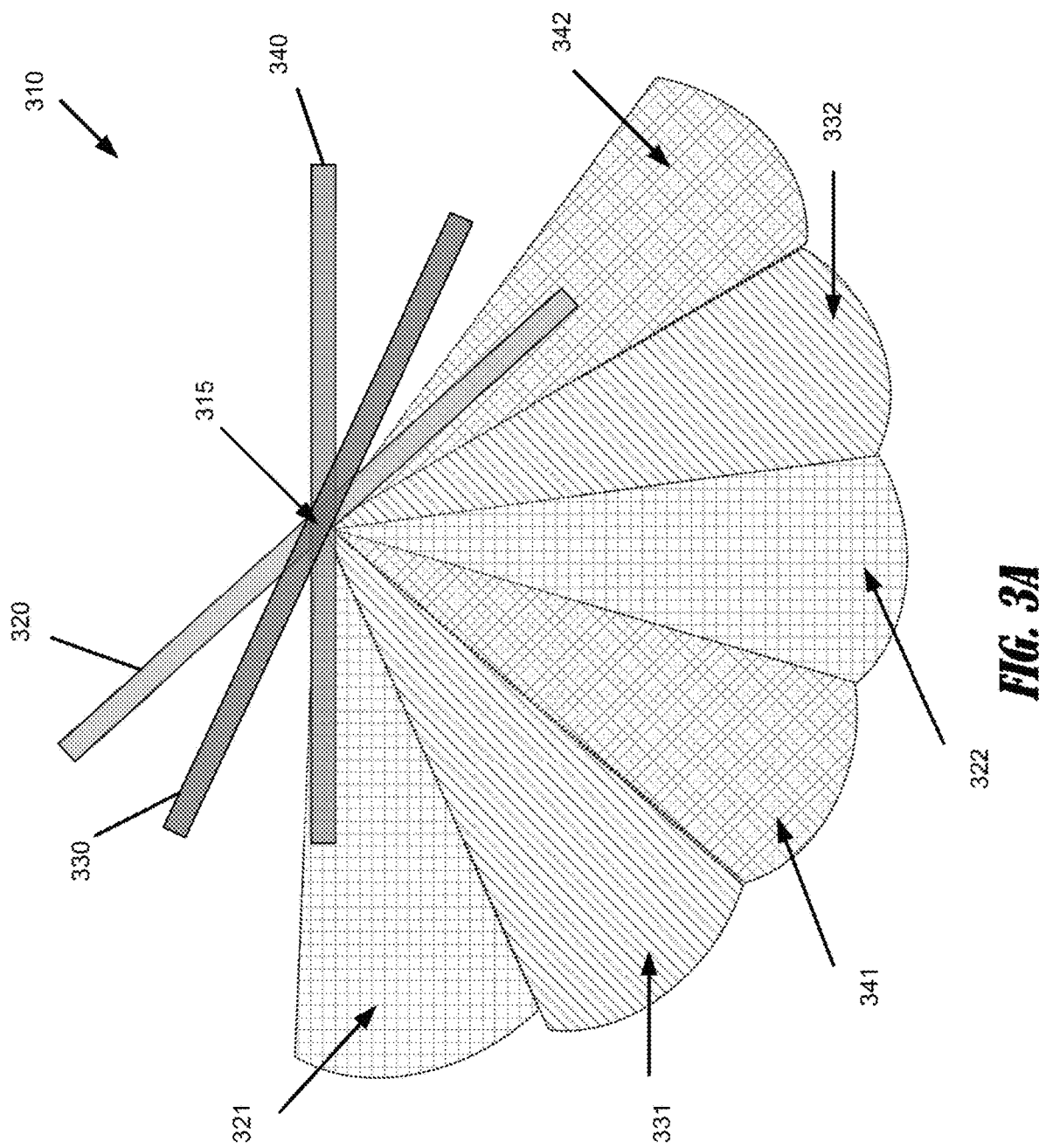

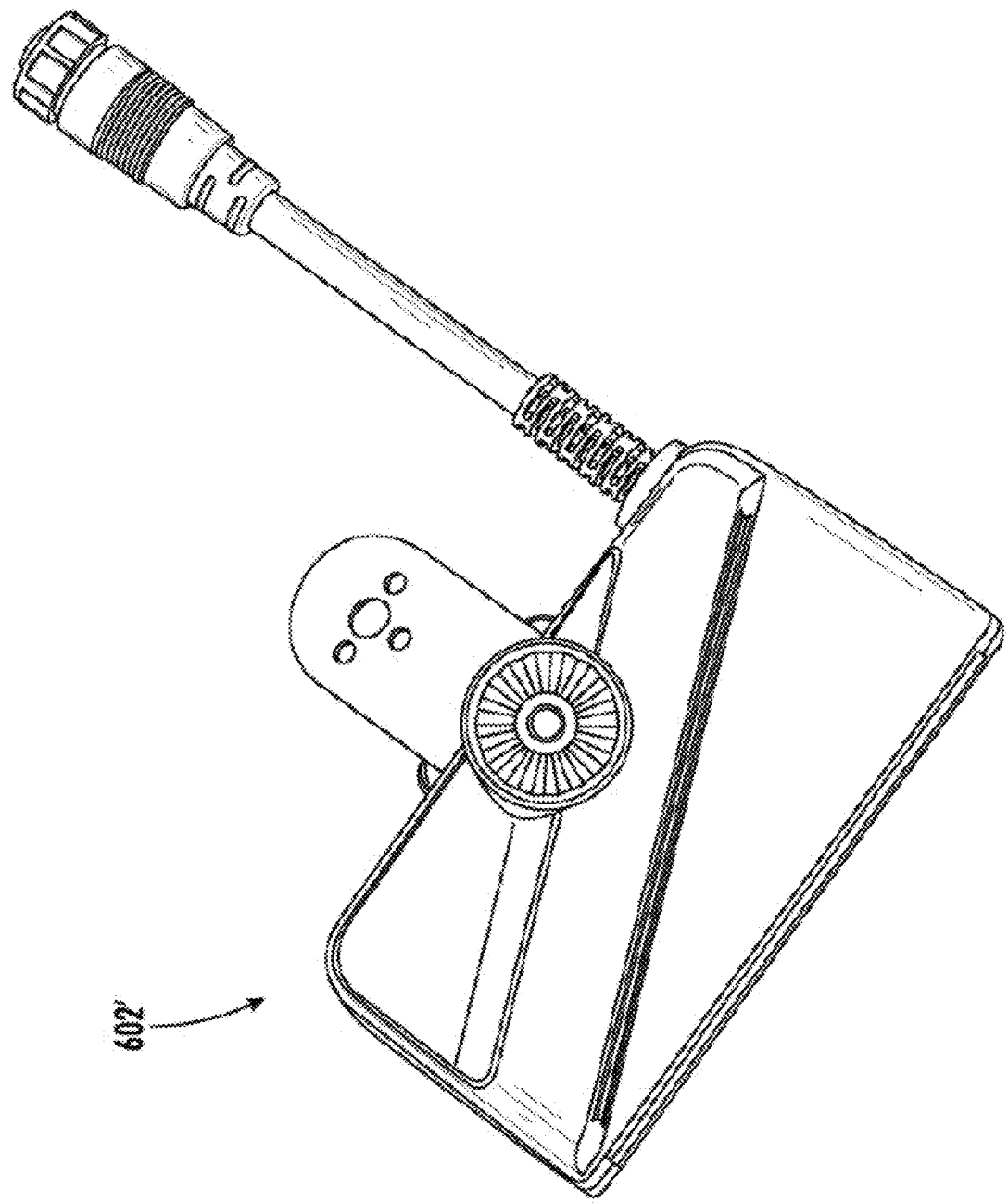

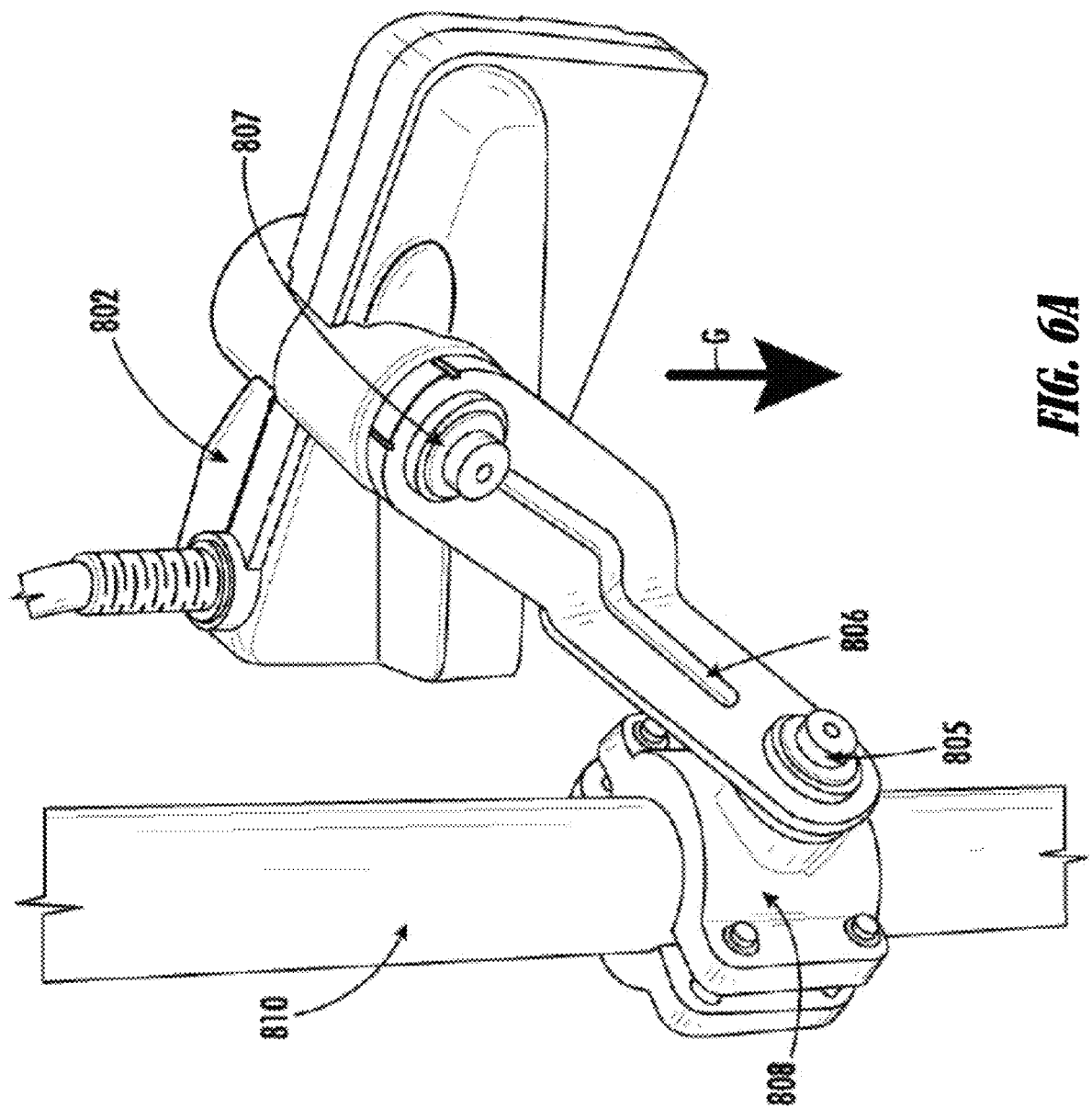

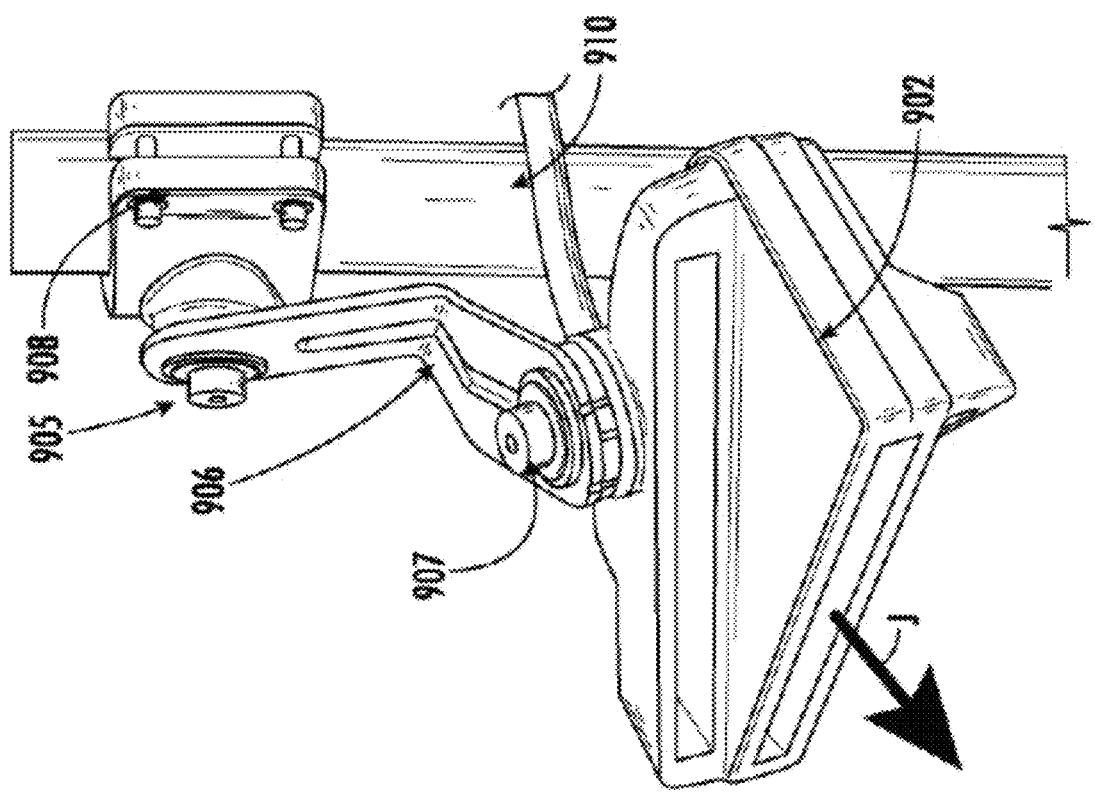

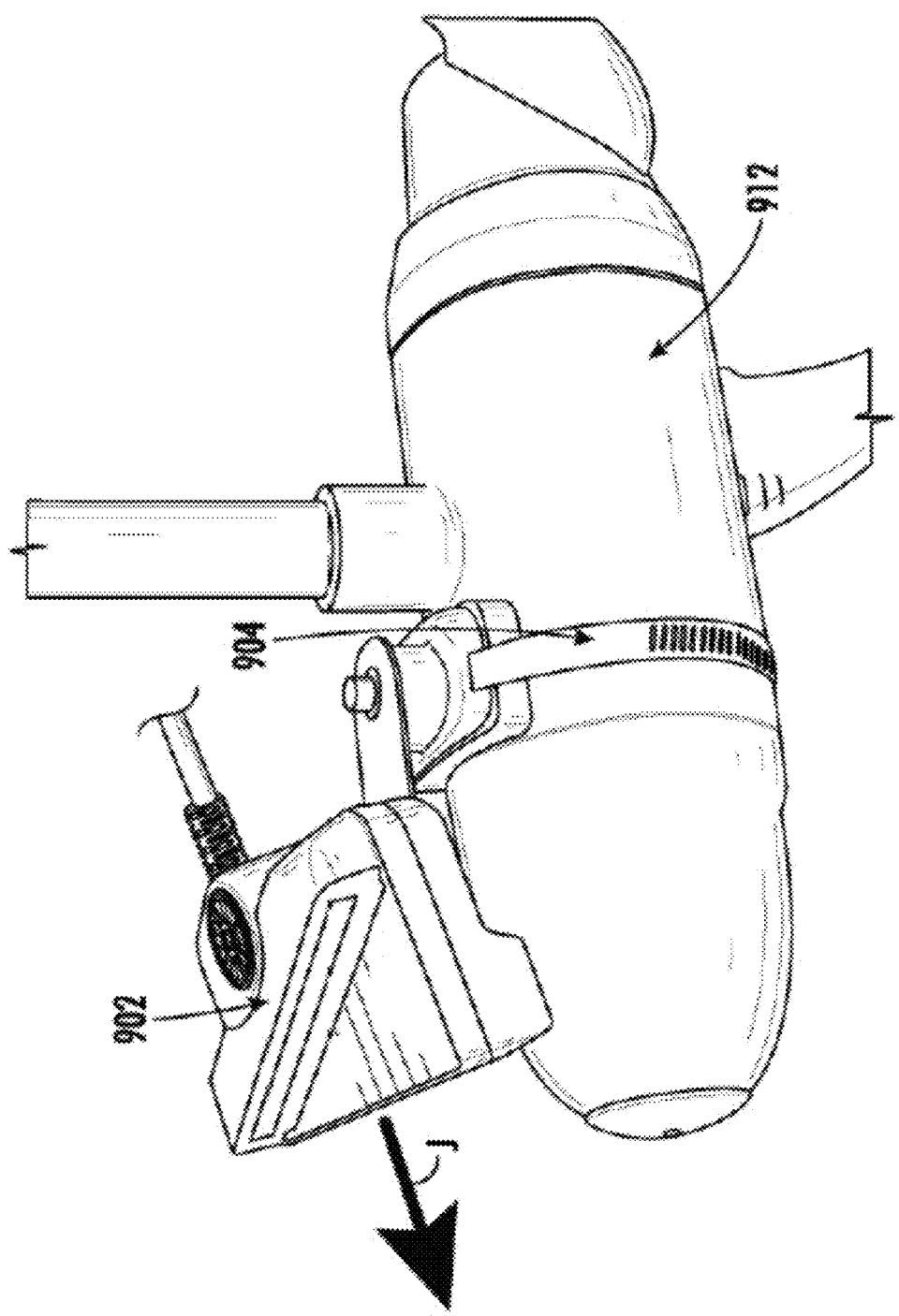

SONAR BEAM SHAPE CONTROLLING HORN

CROSS-REFERENCE TO RELATED APPLICATIONS

This application claims priority and is a continuation of U.S. patent application Ser. No. 17/352,515, filed Jun. 21, 2021, entitled "Sonar Beam Shape Controlling Horn," which is hereby incorporated by reference in its entirety.

FIELD OF THE INVENTION

Embodiments of the present invention relate generally to a horn that may be used to control the beam shape generated by a sonar transducer element and/or array.

BACKGROUND OF THE INVENTION

Watercraft frequently include sonar transducer systems, and these sonar transducer systems may propagate one or more sonar beams into the underwater environment to obtain sonar return data regarding the depth of the floor of the body of water. The sonar beams are emitted into the underwater environment according to beam shapes (such as may have beam widths in the steering direction and the transverse direction of the watercraft, with the two directions being perpendicular to one another).

The frequency steered arrays currently available in the recreational consumer market are not well suited to the task of providing a live sidescan sector image. One reason for this is that the beam width in the transverse direction is not wide enough to provide sufficient context in which to identify structure, objects, and/or the lake/sea bed from a mounting point on a boat near the surface of the water.

Beam shapes (e.g., beam patterns) result from the natural radiation from the planar faces of the transducer elements. There is a tradeoff between the transverse beam width and the radiated on-axis intensity in the steering plane. Using previous systems, if one wished to make the transverse beam width larger, one was required to decrease the transverse length of the radiative elements of the array. While this resulted in a large transverse beam width, this action reduced the total radiated power in the beam at the same time that it reduces the intensity of the beam due to geometric spreading. The result is less acoustic signal energy at the point of the interrogated object. By reciprocity, it also leads to less total force on the receive elements and less signal energy for a given source located in the field of view. The problem is how to provide a wide transverse field of view for the array while maintaining high acoustic signal intensity so that the image quality is maintained over the entire field of view.

BRIEF SUMMARY OF THE INVENTION

A horn is provided herein that may reform a sonar beam generated by a sonar transducer element or array in several beneficial ways. For example, (a) the horn may expand the angular coverage along the transverse direction; (b) the horn may provide more consistent beam shapes regardless of variation in the operating frequency for the sonar transducer element; and (c) the horn may maintain the signal intensity at a more consistent level across the range of angles.

The horn may effectively improve the properties of a generated sonar beam. The horn may also be made and assembled in a cost-effective manner. For example, a horn may be made of rubber or a soft close-cell foam rubber sheet. Further, a horn may be easily assembled/attached with respect to or as a part of a new or an existing sonar transducer array.

In an example embodiment, a system for reforming sonar emissions from a sonar transducer element or an array of sonar transducer elements is provided. The system comprises the sonar transducer element or the array of sonar transducer elements. The sonar transducer element or the array of sonar transducer elements define an emitting face, and the sonar transducer element or the array of sonar transducer elements are configured to transmit sonar signals along one or more paths. The system also comprises a horn comprising at least one surface. The at least one surface is positioned adjacent to or in a spaced apart manner from the emitting face of the sonar transducer element or the array of sonar transducer elements so that the at least one surface is positioned at least partially in the one or more paths such that at least some of the sonar signals transmitted from the sonar transducer element or the array of sonar transducer elements are redirected based on interaction of the at least some of the sonar signals and the at least one surface.

In some embodiments, the horn is configured to expand the field of view of the sonar transducer element or the array of sonar transducer elements in at least one dimension. Additionally, in some embodiments, the sonar signals are emitted from the sonar transducer element or the array of sonar transducer elements with a transverse beam width and a longitudinal beam width, and the horn is configured to expand the transverse beam width. In some embodiments, the horn is configured to provide an intensity of over −20 dB for a field of view of 60 degrees. Furthermore, in some embodiments, the horn is configured to provide an intensity of over −20 dB for a field of view of 60 degrees when the sonar transducer element or the array of sonar transducer elements are operating at a frequency of 950 kHz. In some embodiments, the sonar transducer element or the array of sonar transducer elements are secured to a watercraft and are configured to provide sonar return data corresponding to a side-scan image.

In some embodiments, the sonar transducer element or the array of sonar transducer elements are configured to operate at a frequency between 400 kHz and 1300 kHz.

In some embodiments, the horn comprises at least two diffraction surfaces that are each curved, convex surfaces that are positioned opposite each other, and each of the curved, convex surfaces are configured to protrude toward each other and into the path of the at least some of the sonar signals. In some embodiments, the system comprises a plurality of horns, and each horn of the plurality of horns is configured to rest within a respective path of the one or more paths.

In some embodiments, the horn is configured to be secured adjacent to the emitting face so that the horn abuts the emitting face. In some embodiments, the horn is configured to be secured at a distance away from the emitting face.

In some embodiments, the sonar transducer element or the array of sonar transducer elements comprise a first sonar transducer array with a corresponding first horn. The system also comprises a second sonar transducer array with a corresponding second horn. The first sonar transducer array has a first emitting face and the second sonar transducer array has a second emitting face, and the first emitting face of the first sonar transducer array and the second emitting face of the second sonar transducer array are oriented in different directions. Additionally, in some embodiments, the system also includes a processor. The processor is configured to receive first sonar return data from the first sonar transducer array and second sonar return data from the second sonar transducer array, and the first sonar return data and the second sonar return data are formed utilizing frequency steering. The processor is also configured to generate a sonar image. The sonar image comprises a first portion and a second portion. The first portion is formed based on the first sonar return data from the first sonar transducer. The first portion comprises a first end and a second end. The first sonar return data varies in frequency leading from the first end to the second end of the first portion, and a first frequency of the first sonar return data proximate the first end is lower than a second frequency proximate the second end. The second portion is formed based on the second sonar return data from the second sonar transducer. The second portion comprises a first end and a second end. The second sonar return data varies in frequency leading from the first end to the second end of the second portion, and a first frequency of the second sonar return data proximate the first end is lower than a second frequency proximate the second end. The first portion is adjacent the second portion such that the first end of the first portion is adjacent the second end of the second portion. The first frequency of the first sonar return data is different than the second frequency of the second sonar return data such that there is a frequency disparity between the first end of the first portion and the second end of the second portion. The first horn is configured to redirect at least some of the sonar signals corresponding to at least the first frequency of the first sonar return data, and the second horn is configured to redirect at least some of the sonar signals corresponding to at least the second frequency of the second sonar return data to cause a smooth transition in the sonar image between the first end of the first portion and the second end of the second portion.

In some embodiments, the at least one surface is positioned relative to the emitting face of the sonar transducer element or the array of sonar transducer elements such that the at least one surface at least partially redirects the at least some of the sonar signals emitted from the sonar transducer element or the array of sonar transducer elements before any other surface.

In another example embodiment, a horn for controlling sonar beam shapes is provided. The horn comprises at least one surface. The at least one surface of the horn is configured to be positioned at least partially in a path of a sonar beam generated by a sonar transducer element or an array of sonar transducer elements so as to at least partially reform at least some sonar signals transmitted from the sonar transducer element or the array of sonar transducer elements based on interaction of the at least some of the sonar signals and the at least one surface.

In some embodiments, the horn comprises rubber material. In some embodiments, the horn comprises a soft closed-cell foam rubber sheet. Additionally, in some embodiments, the at least one surface is a curved surface. In some embodiments, the horn is configured to expand a field of view of the sonar transducer element or the array of sonar transducer elements in at least one dimension.

In another example embodiment, a method for operating a sonar system is provided. The method comprises providing a sonar transducer element or an array of sonar transducer elements. The sonar transducer element or the array of sonar transducer elements define an emitting face, and the sonar transducer element or the array of sonar transducer elements are configured to transmit sonar signals along one or more paths. The method also comprises providing a horn comprising at least one surface. The at least one surface is positioned adjacent to or in a spaced apart manner from the emitting face of the sonar transducer element or the array of sonar transducer elements so that the at least one surface is positioned at least partially in the one or more paths such that at least some of the sonar signals transmitted from the sonar transducer element or the array of sonar transducer elements are reformed based on interaction of the at least some of the sonar signals and the at least one surface. The method also comprises causing emission of the sonar signals from the emitting face into the one or more paths.

BRIEF DESCRIPTION OF THE DRAWINGS

Figure 1:
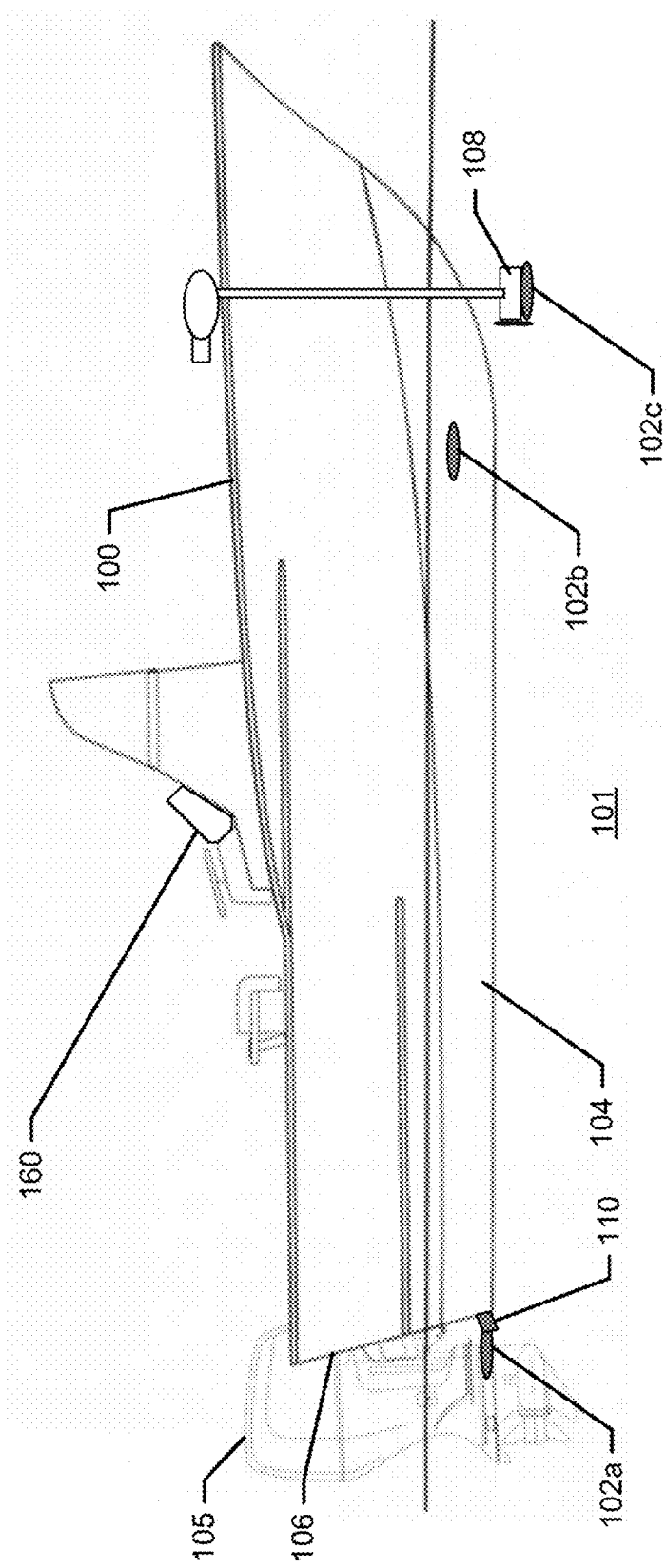
Figure 2A:
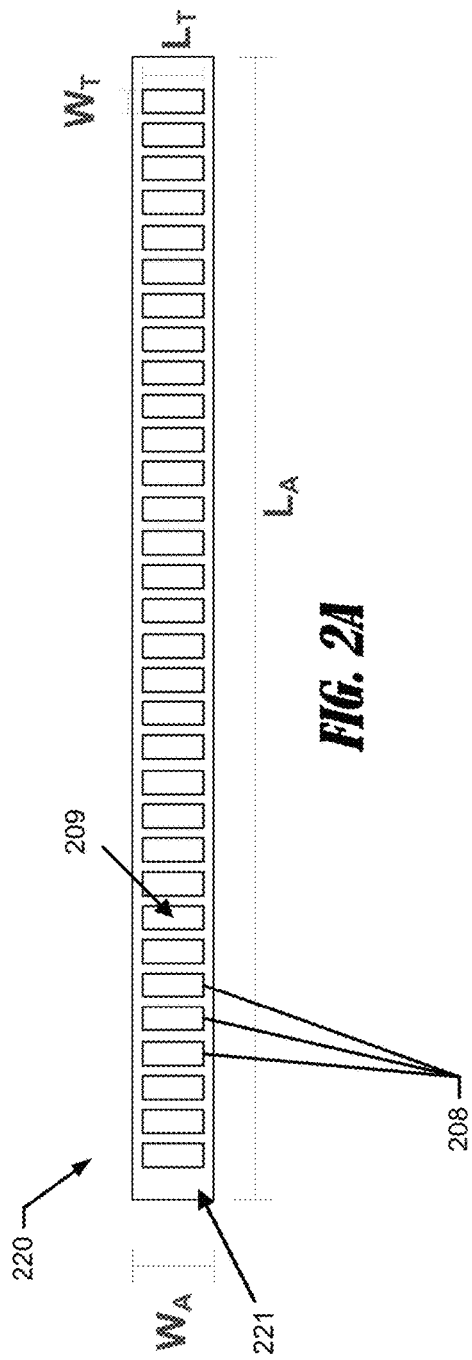
Figure 2B:
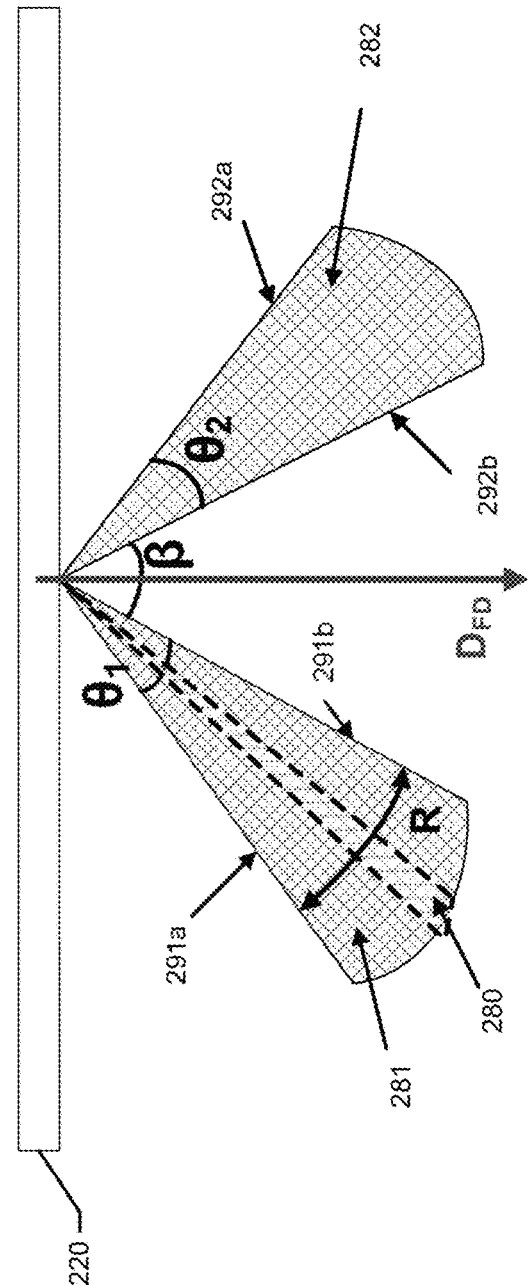
Figure 2C:
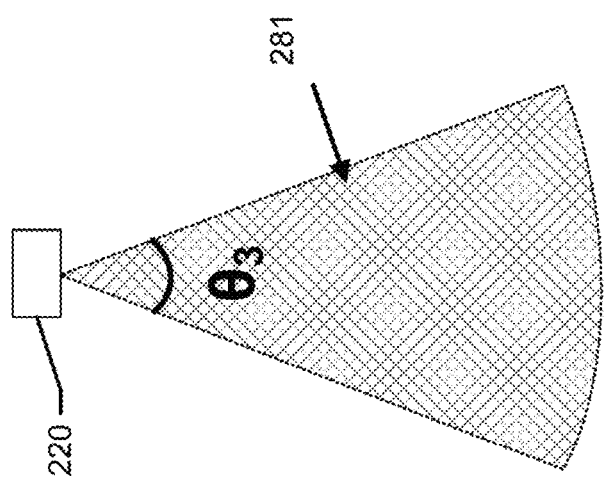
Figure 3B:
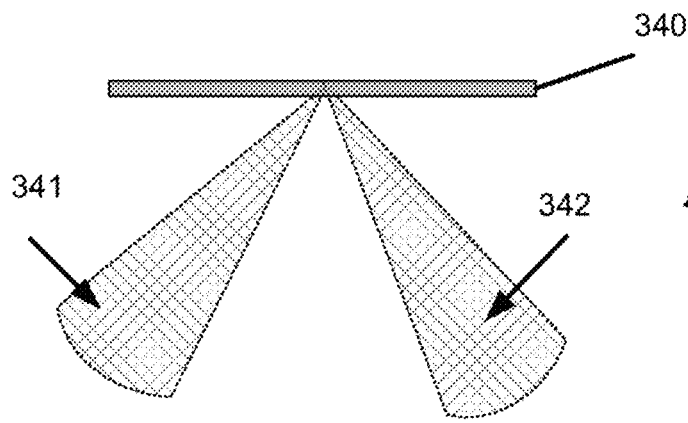
Figure 3C:
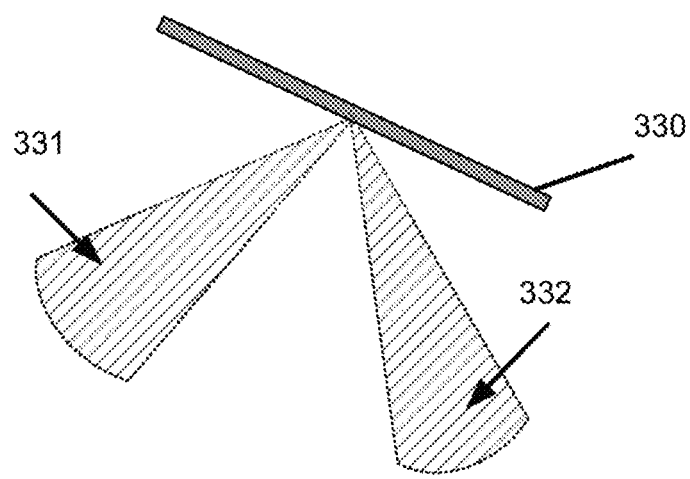
Figure 3D:
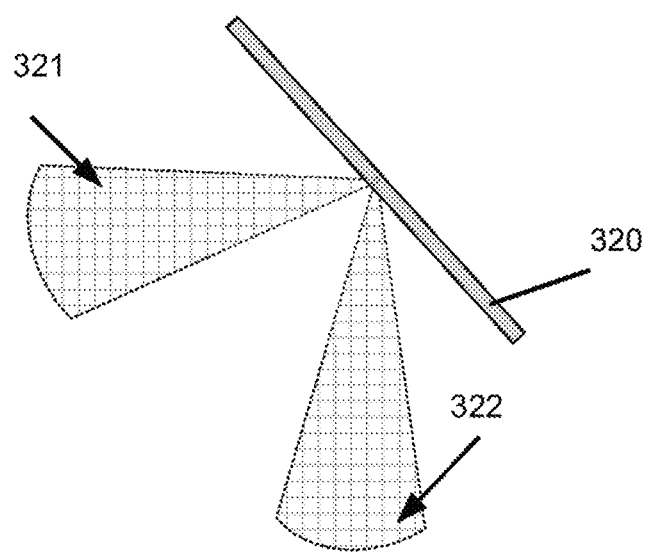
Figure 4:
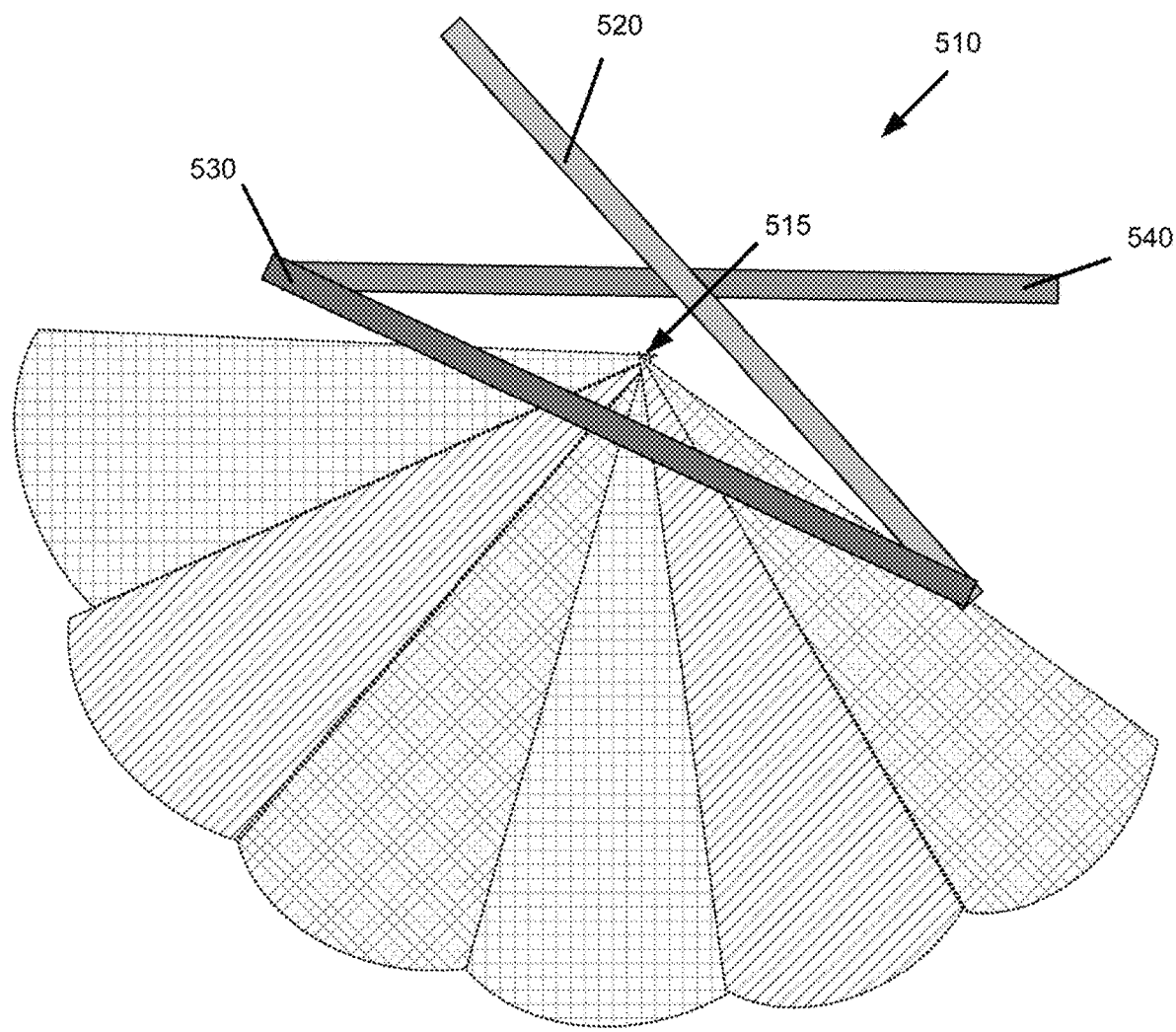
Figure 5A:
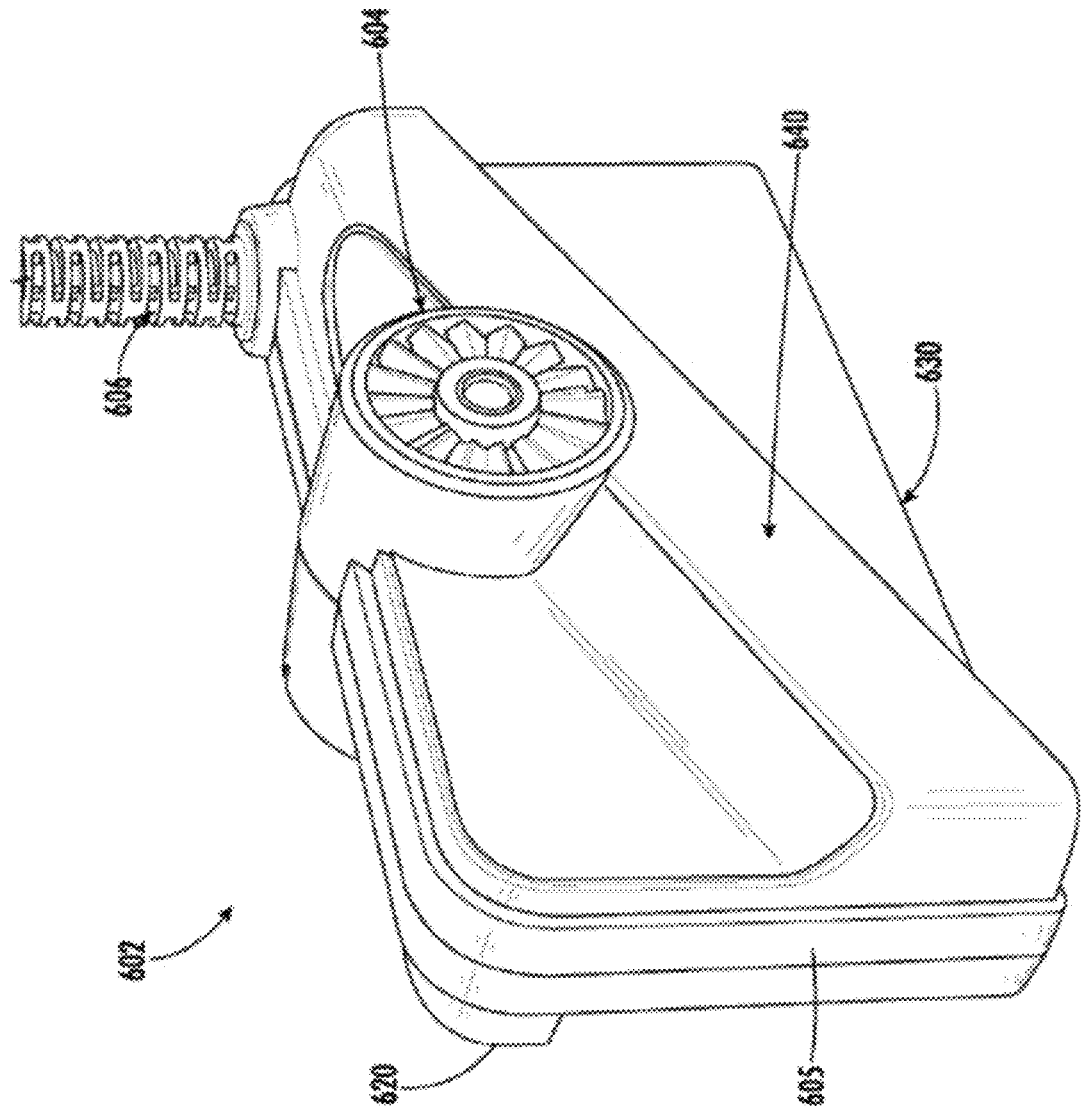
Figure 5B:
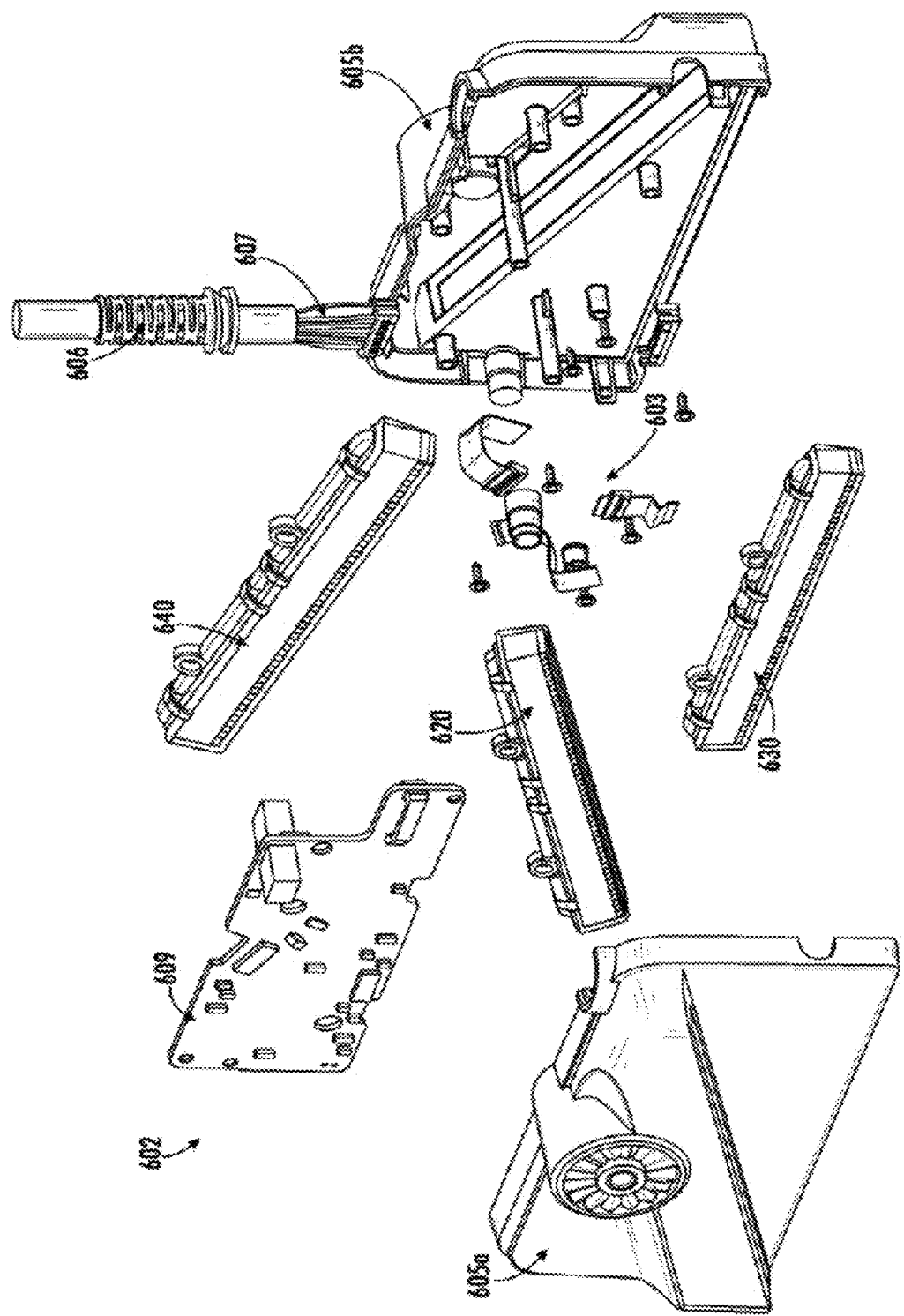
Figure 6B:
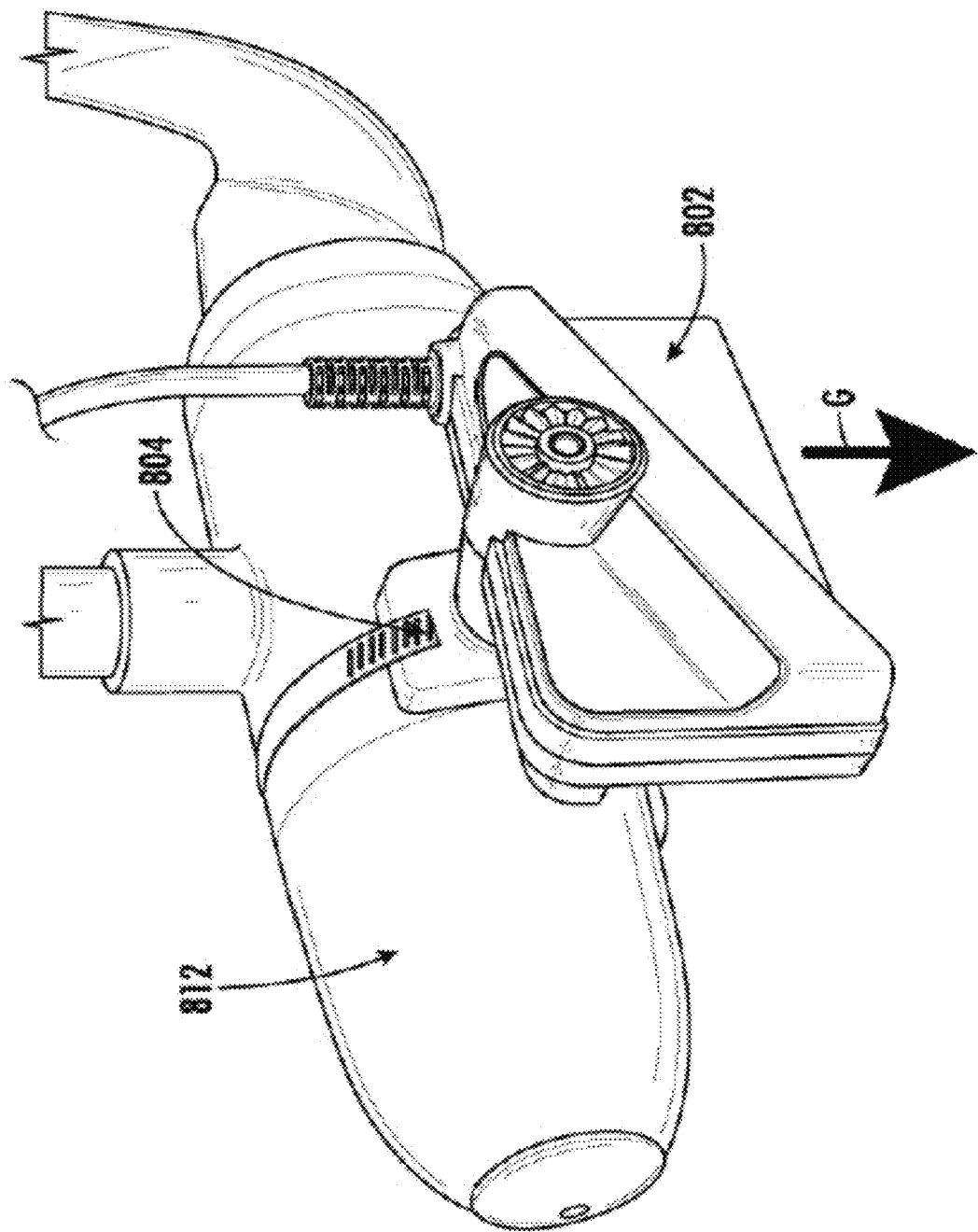
Figure 8:
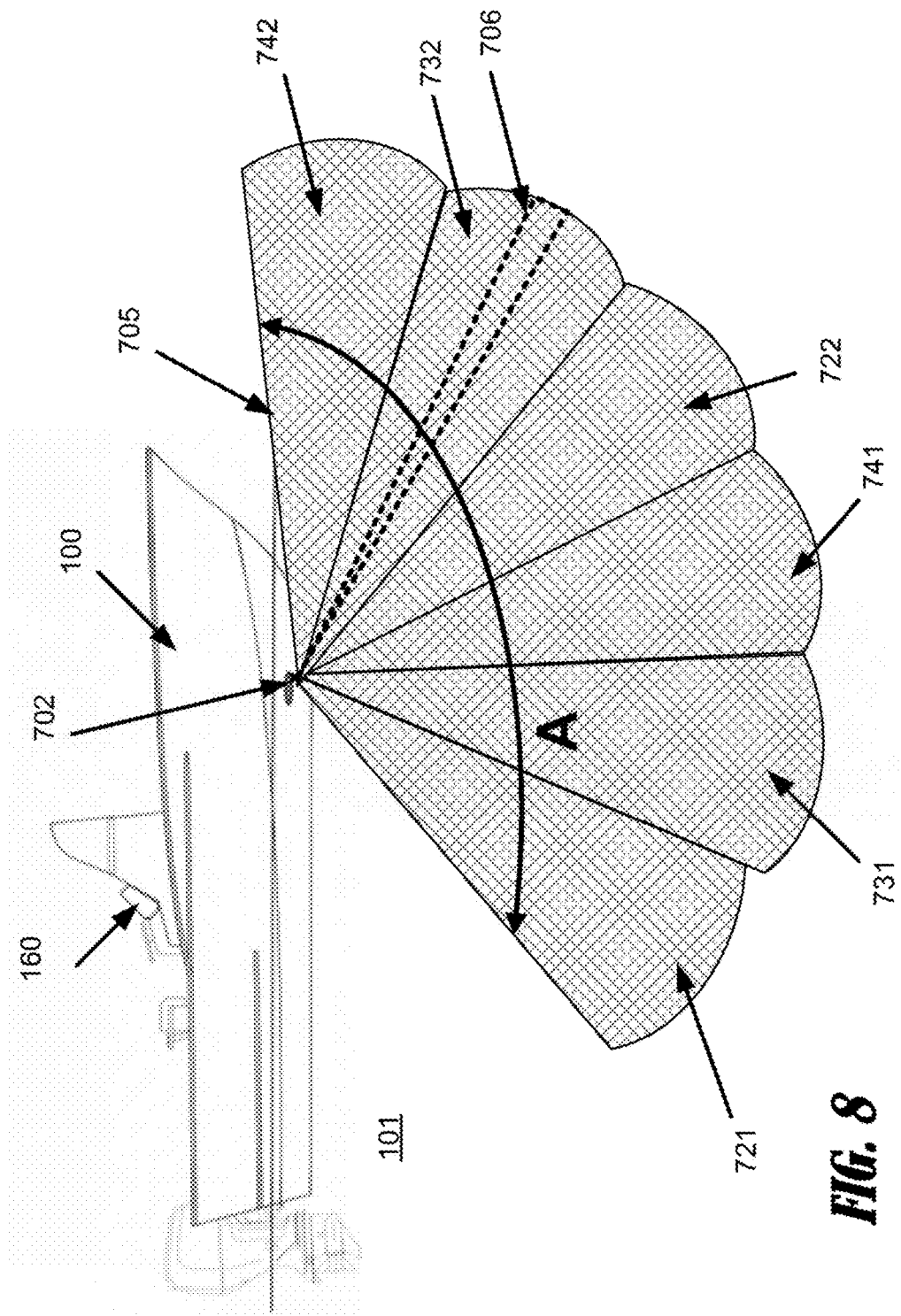
Figure 9:
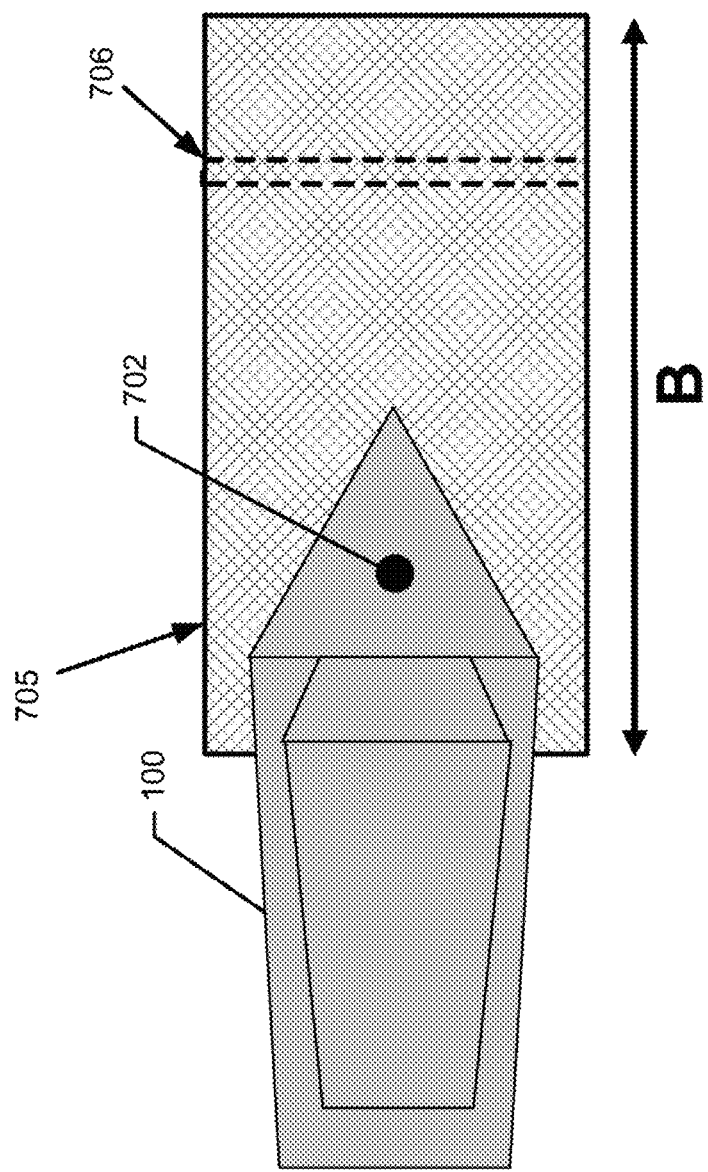
Figure 10A:
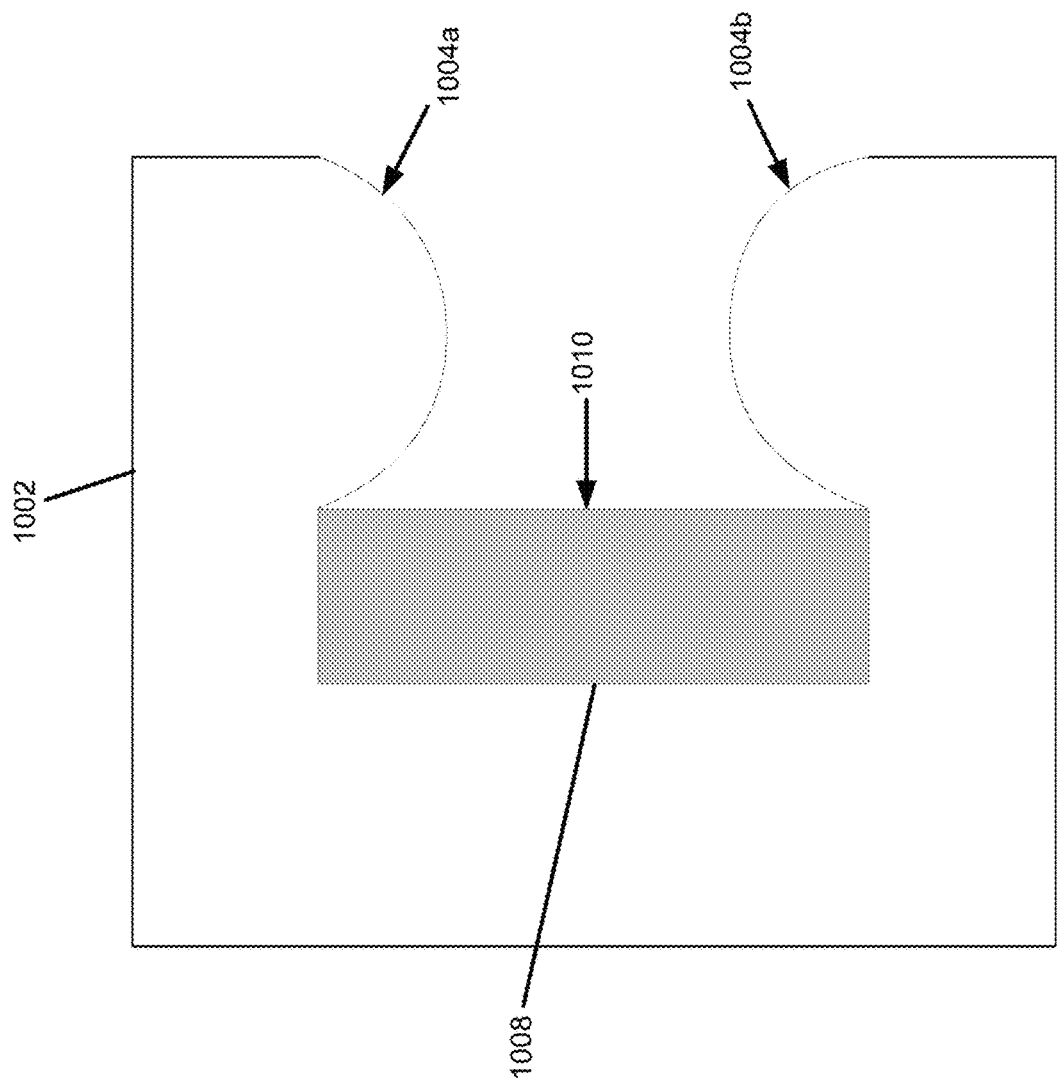
Figure 10B:
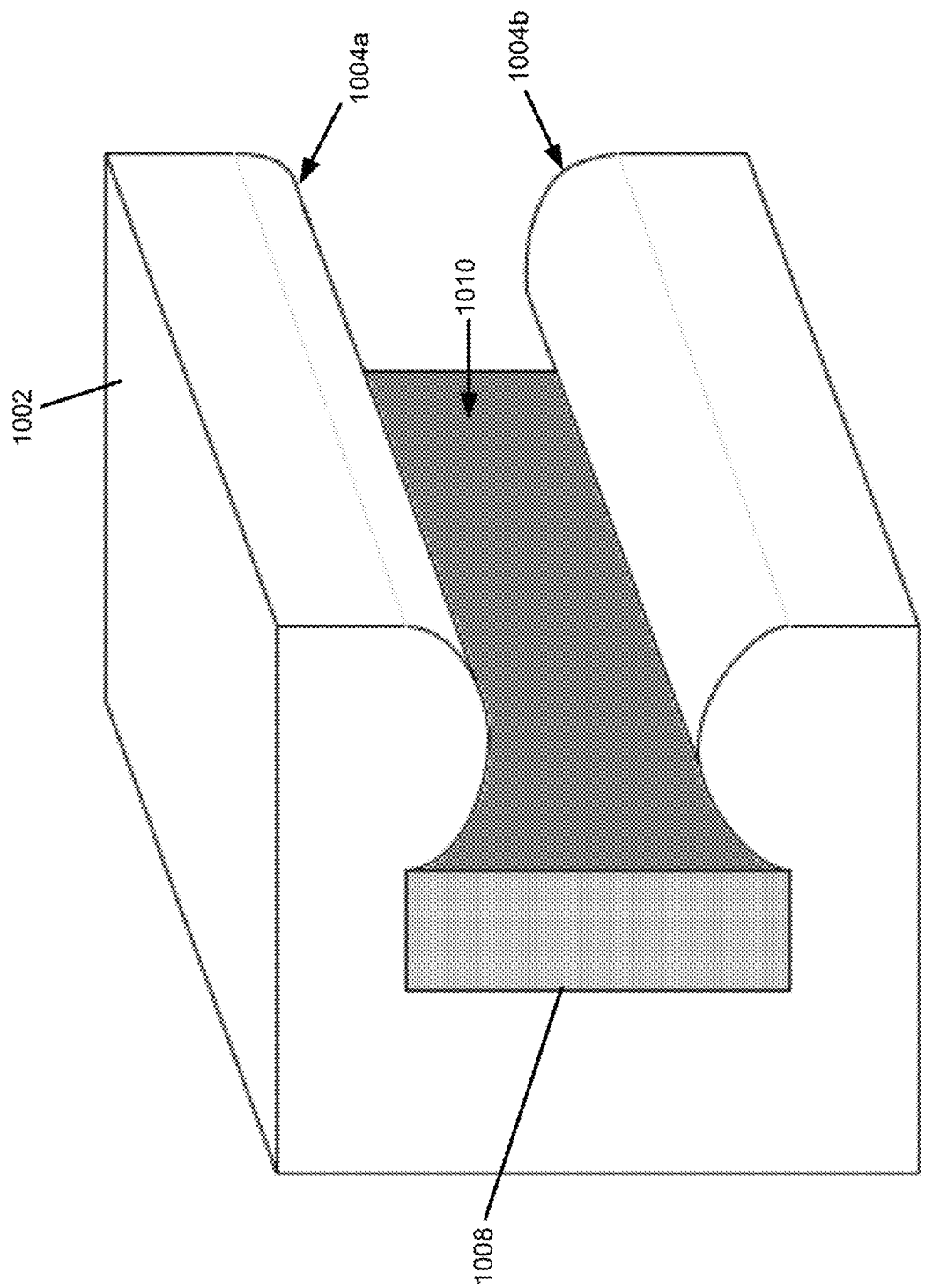
Figure 10C:
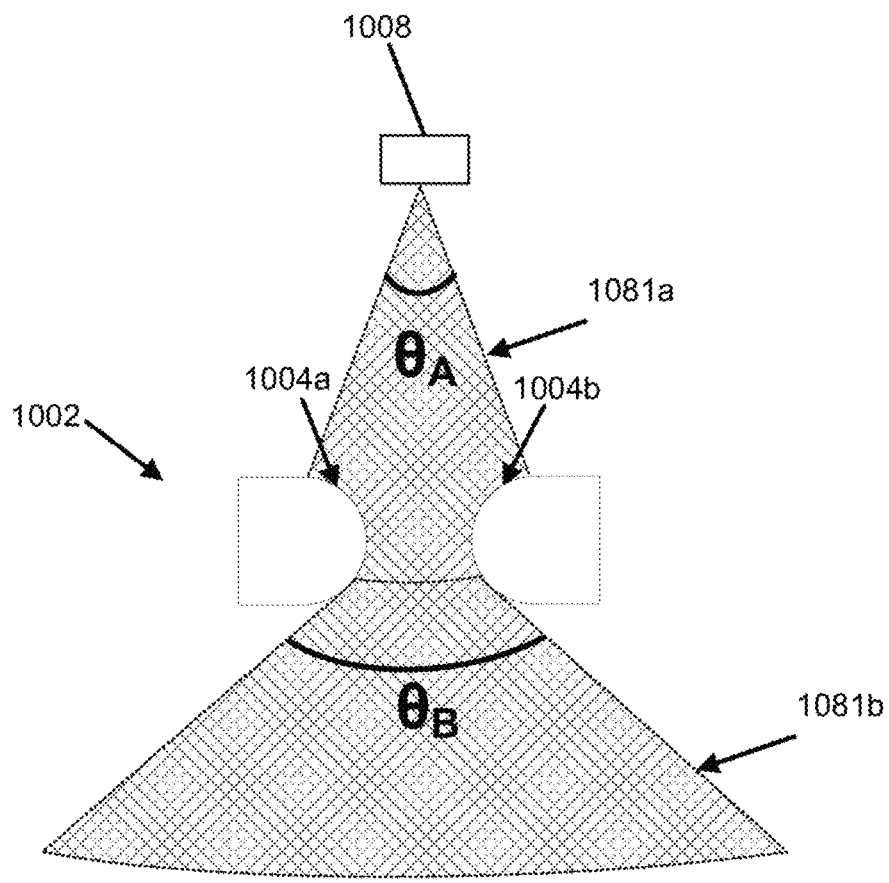
Figure 10D:
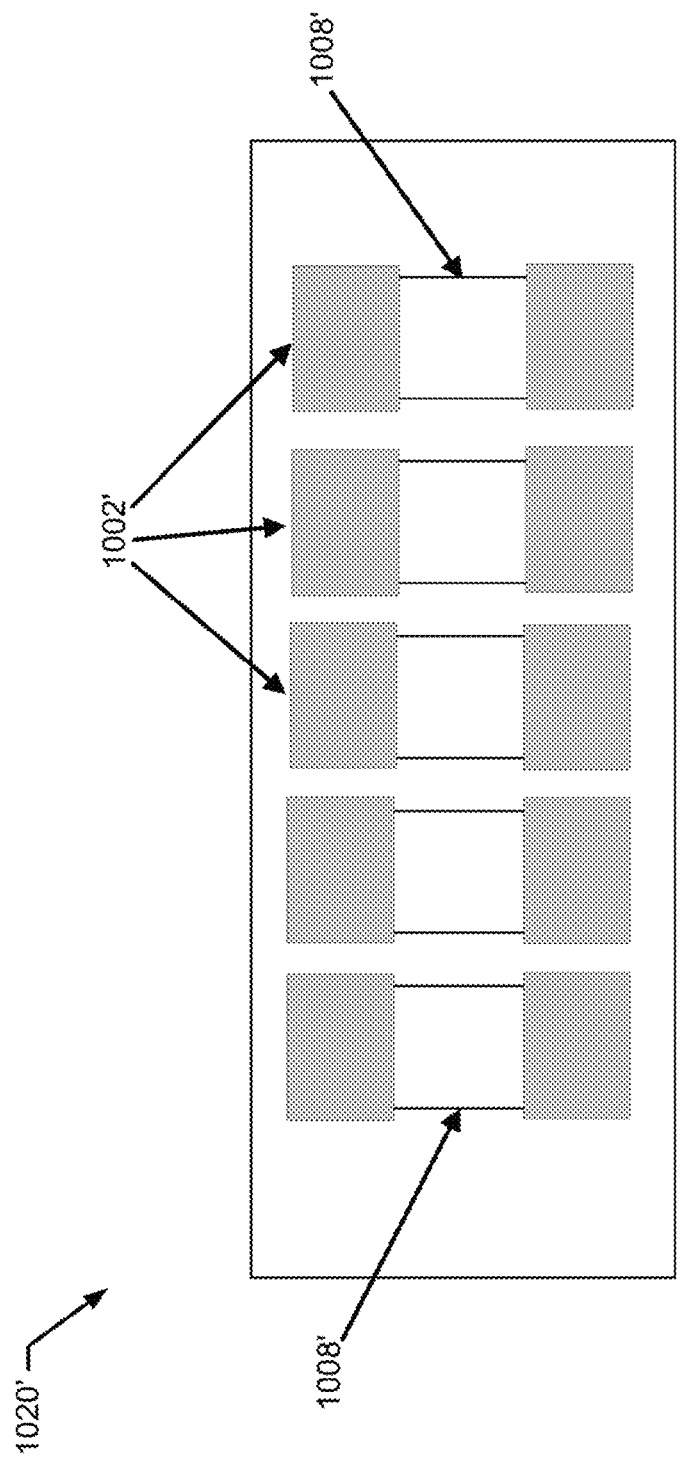
Figure 10E:
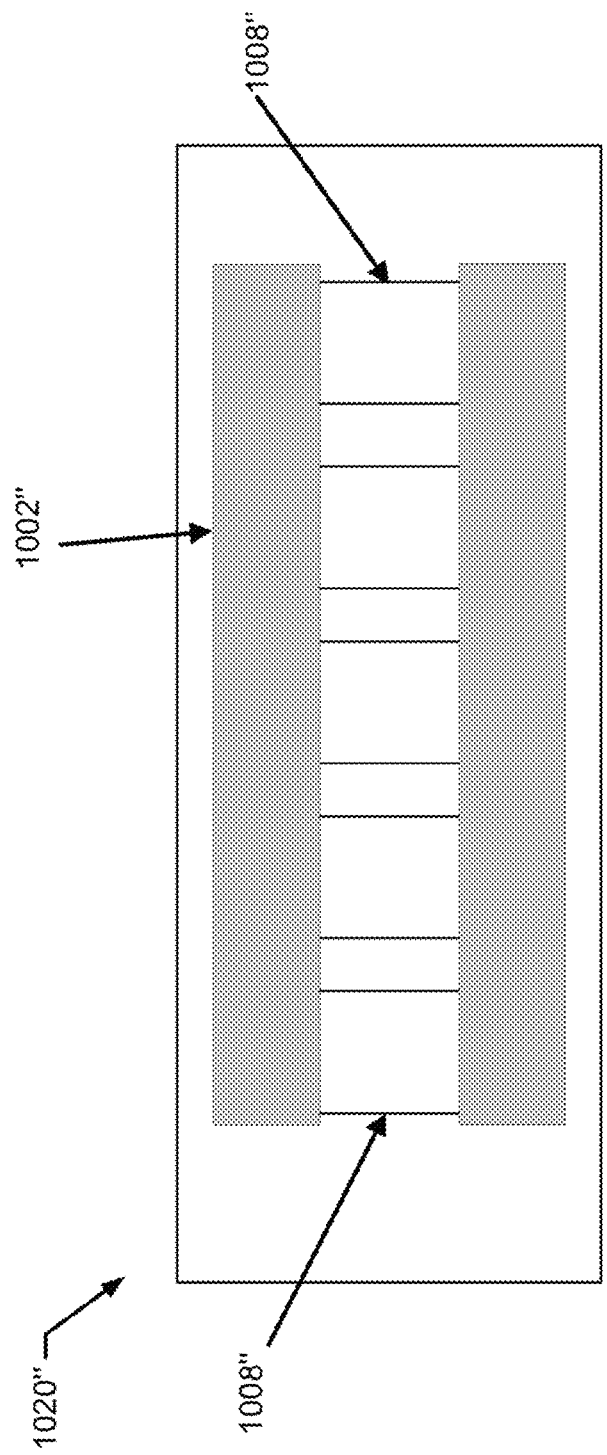
Figure 11A:
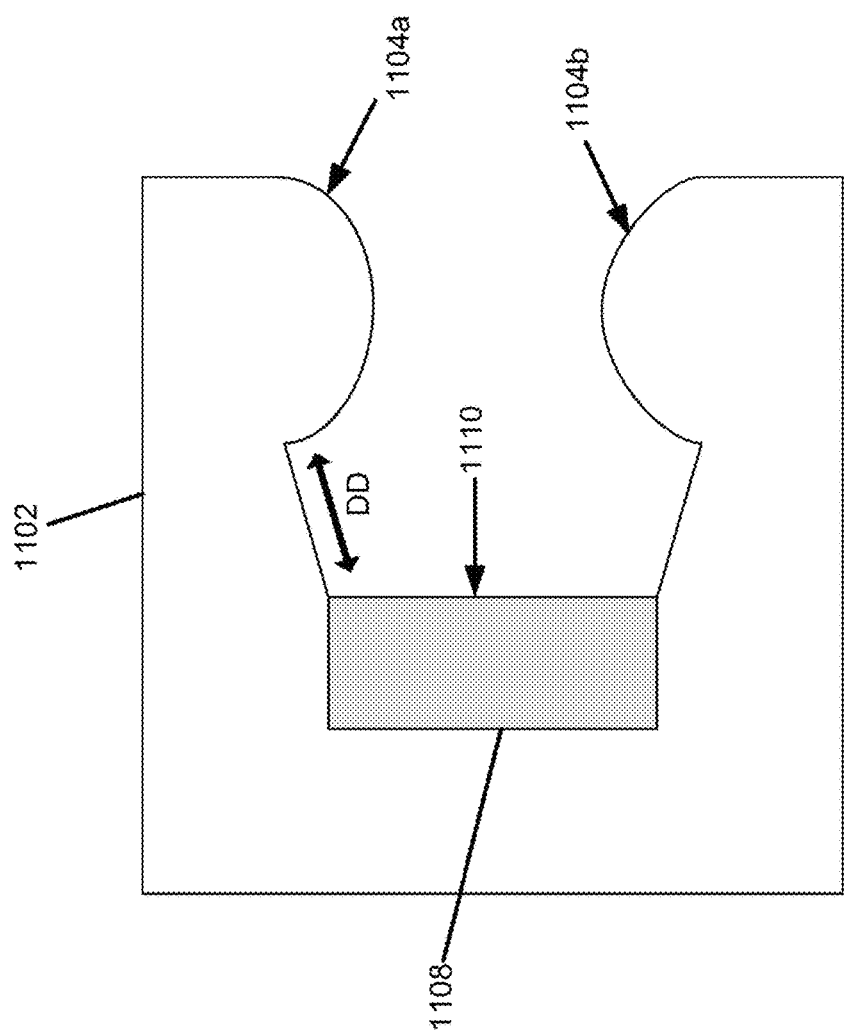
Figure 11B:
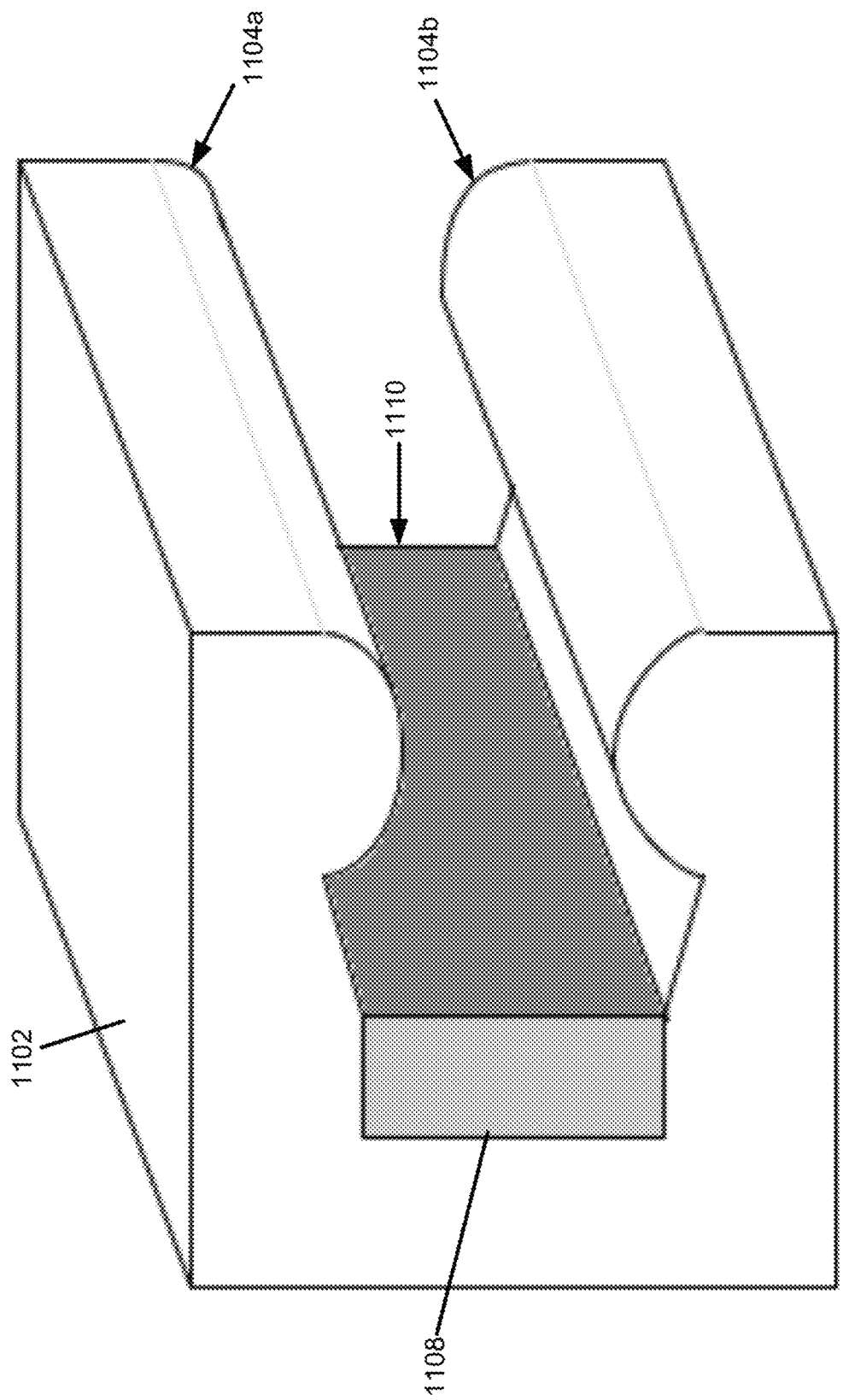
Figure 12A:
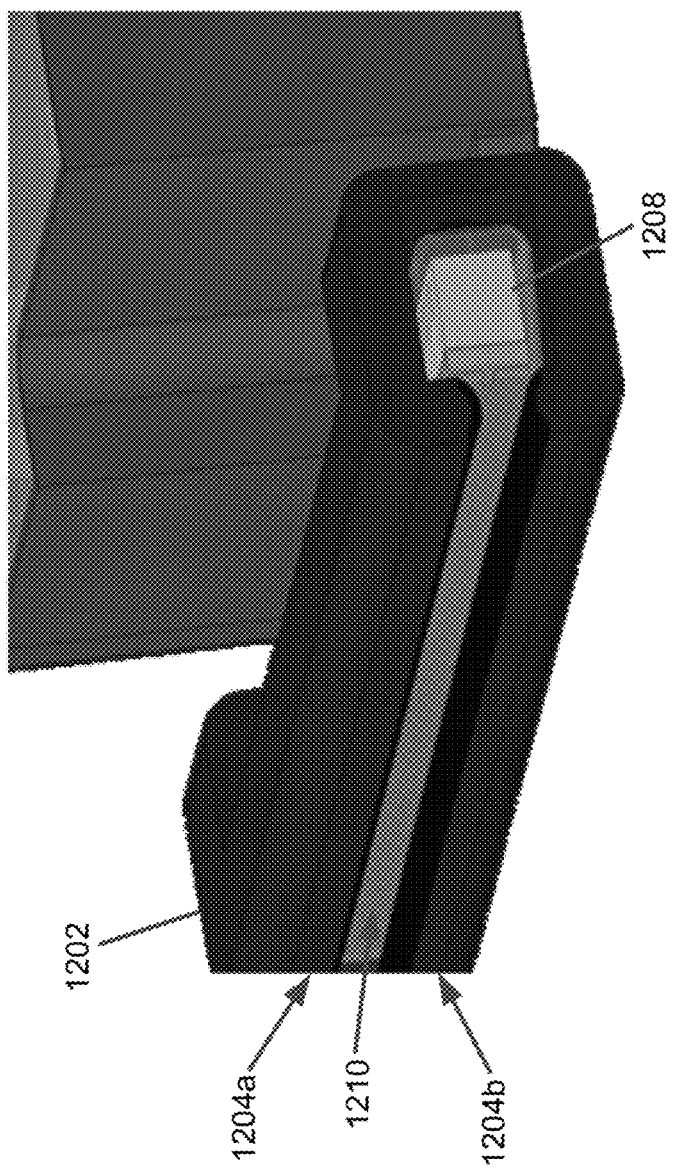
Figure 12B:
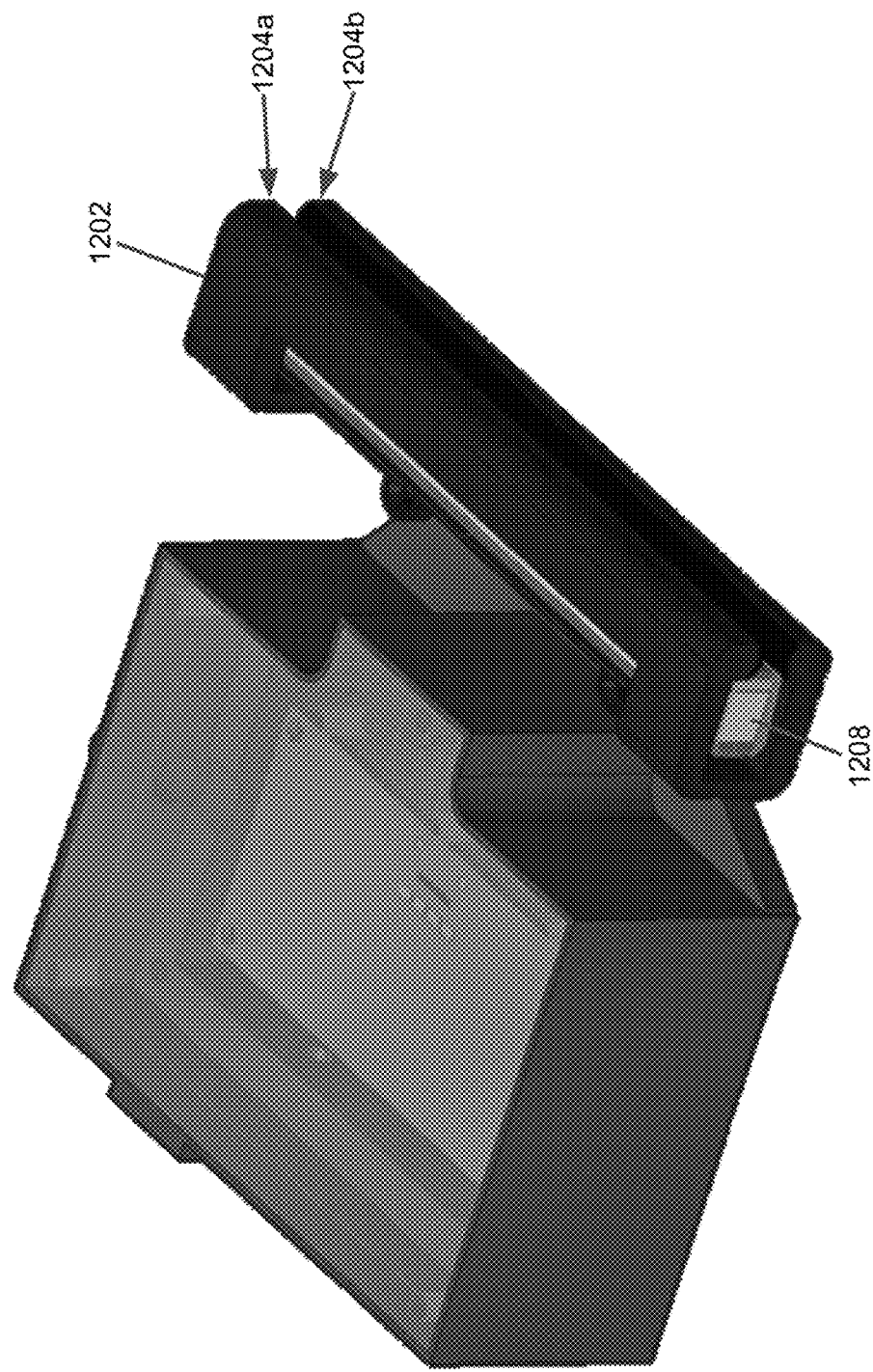
Figure 13:
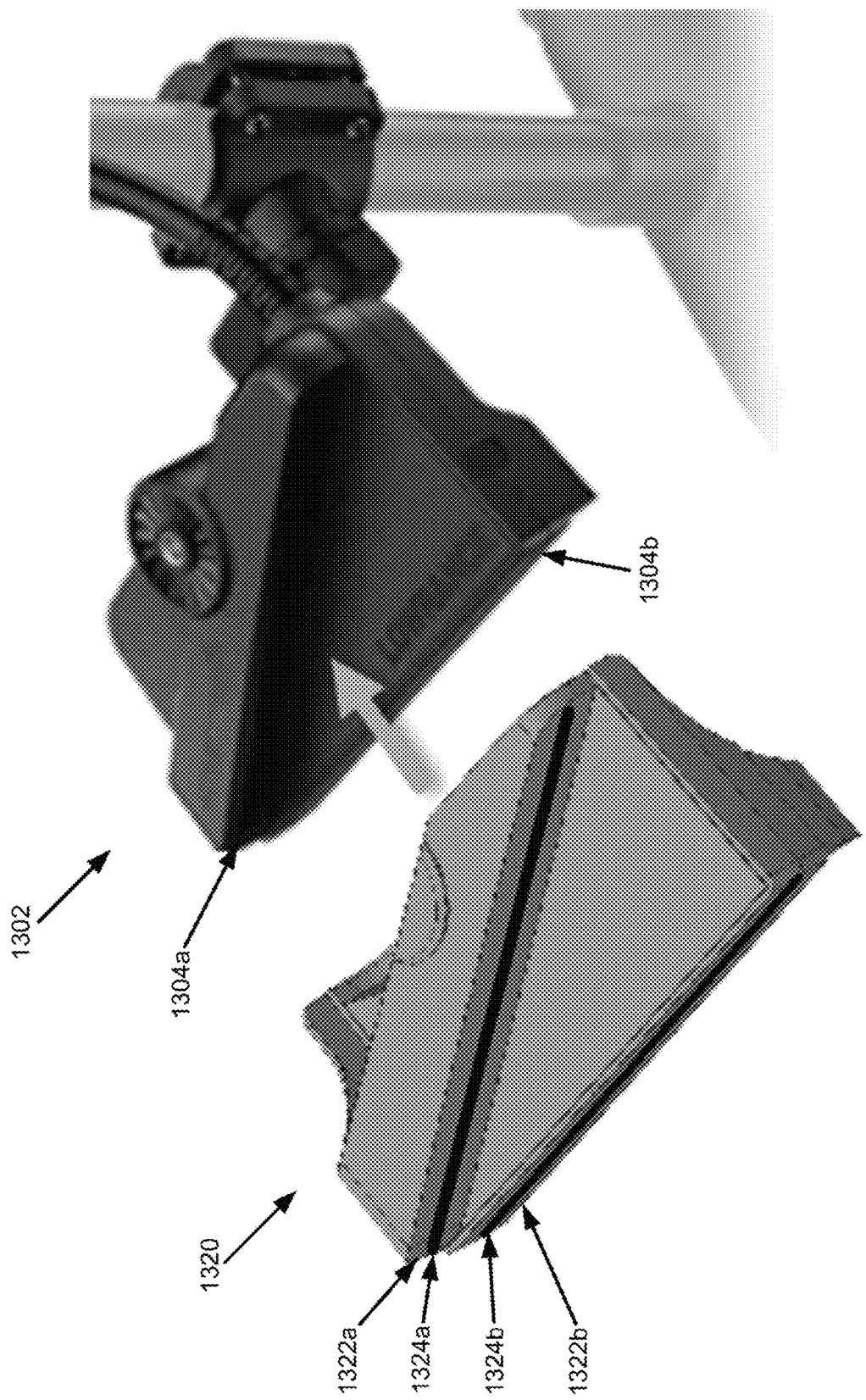
Figure 14A:
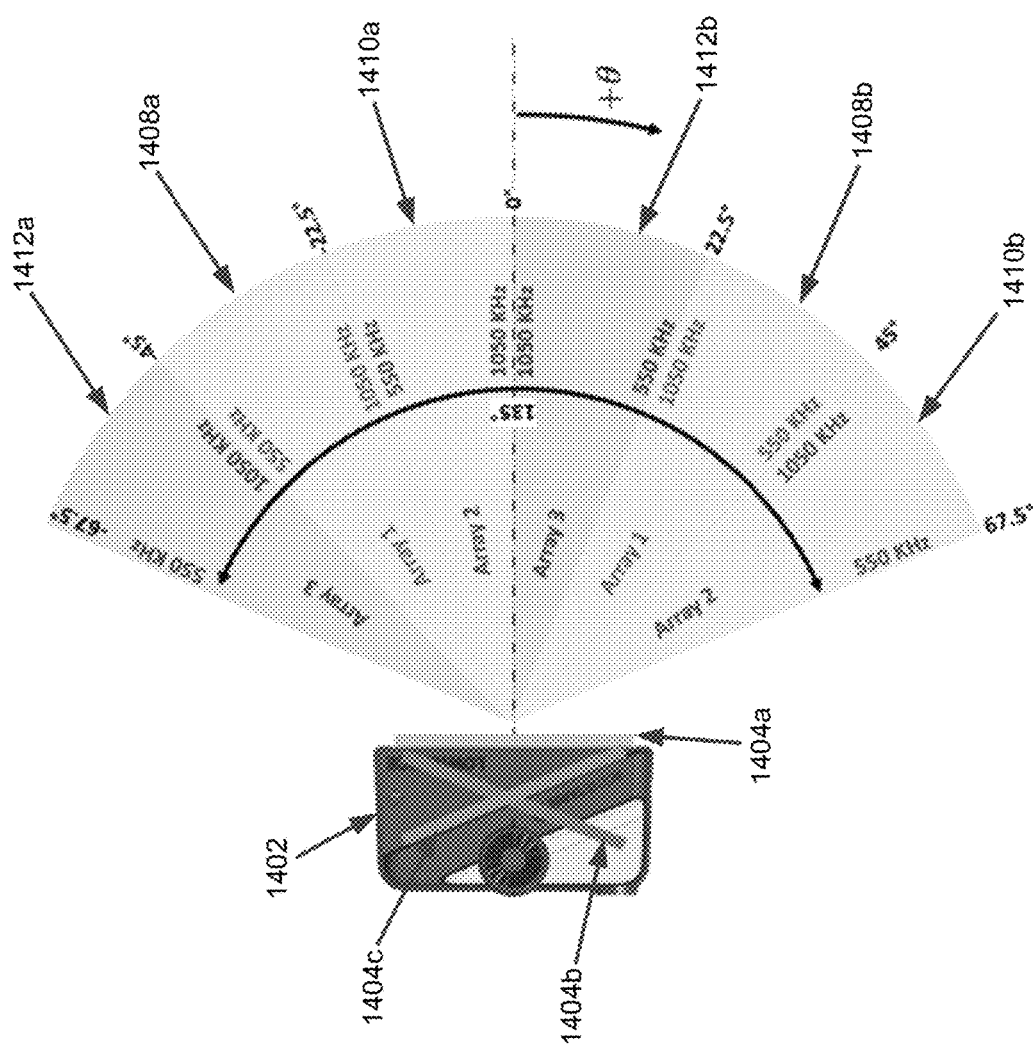
Figure 14B:
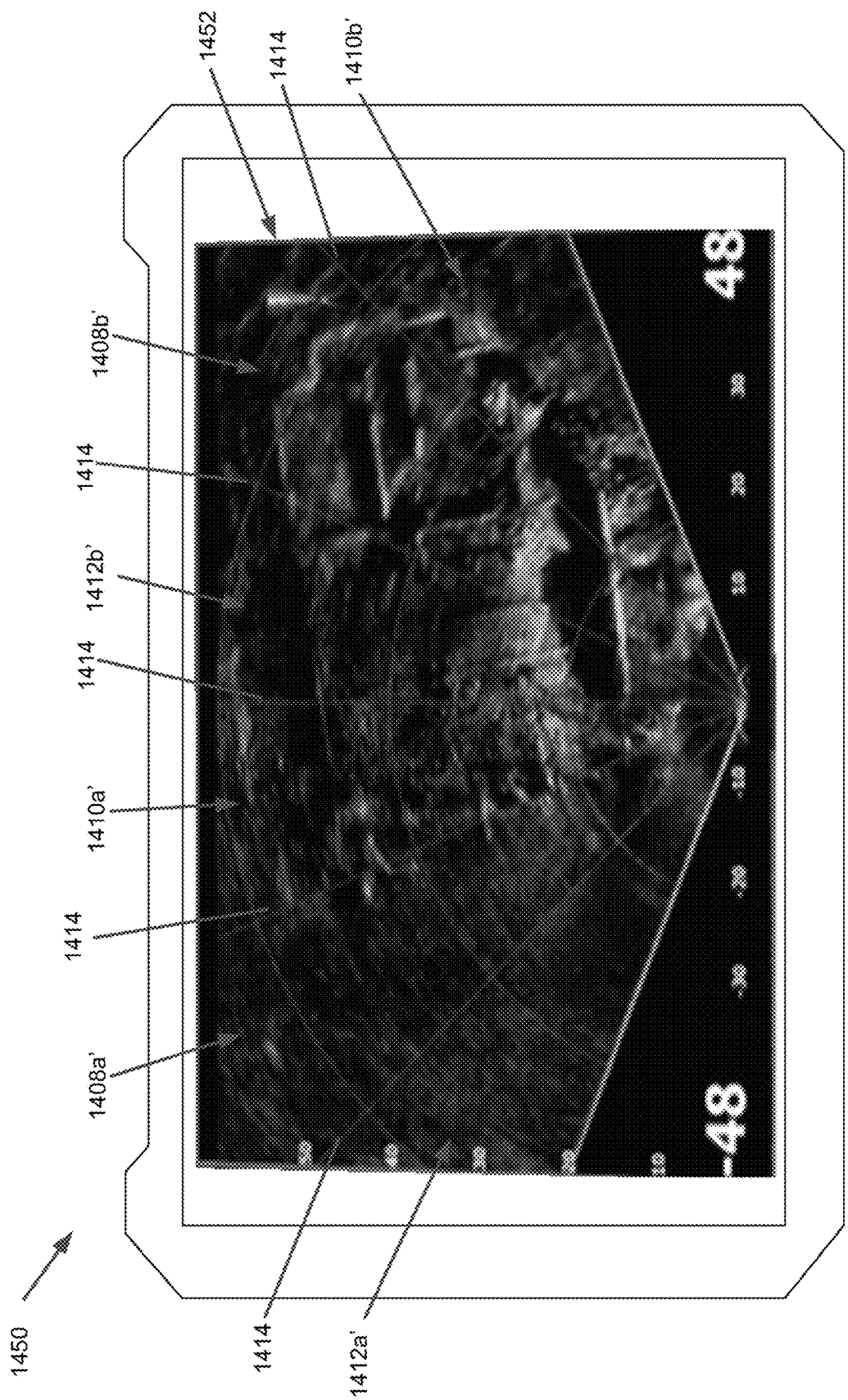
Figure 15B:
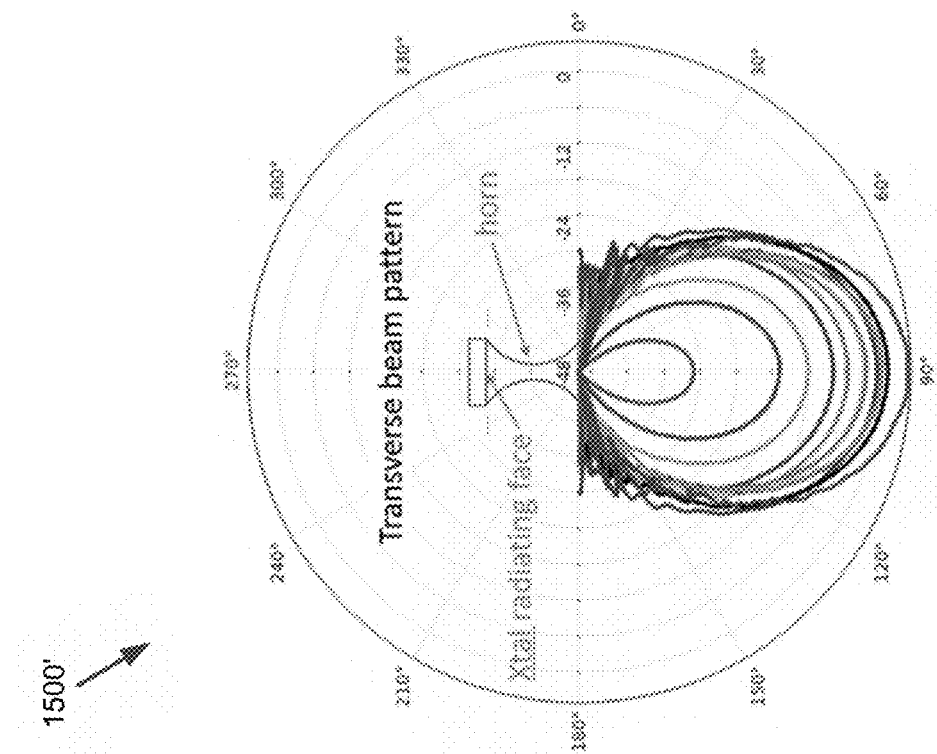
Figure 15A:
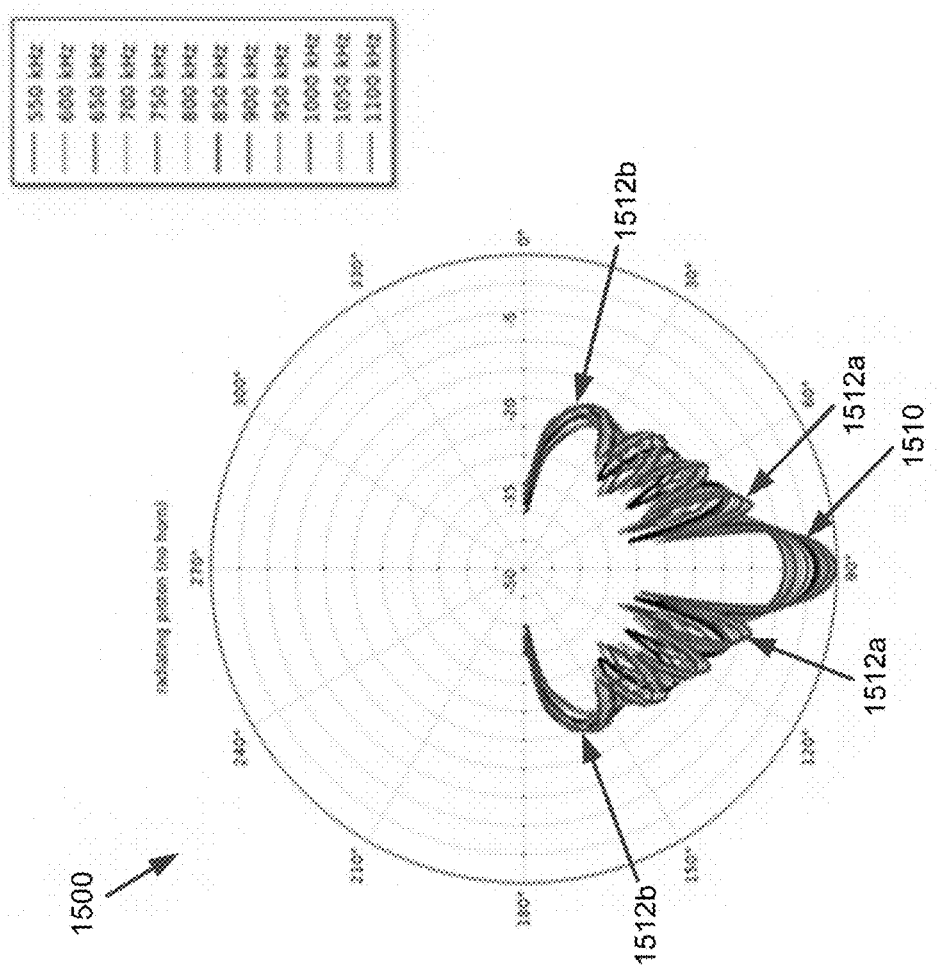
Figure 16B:
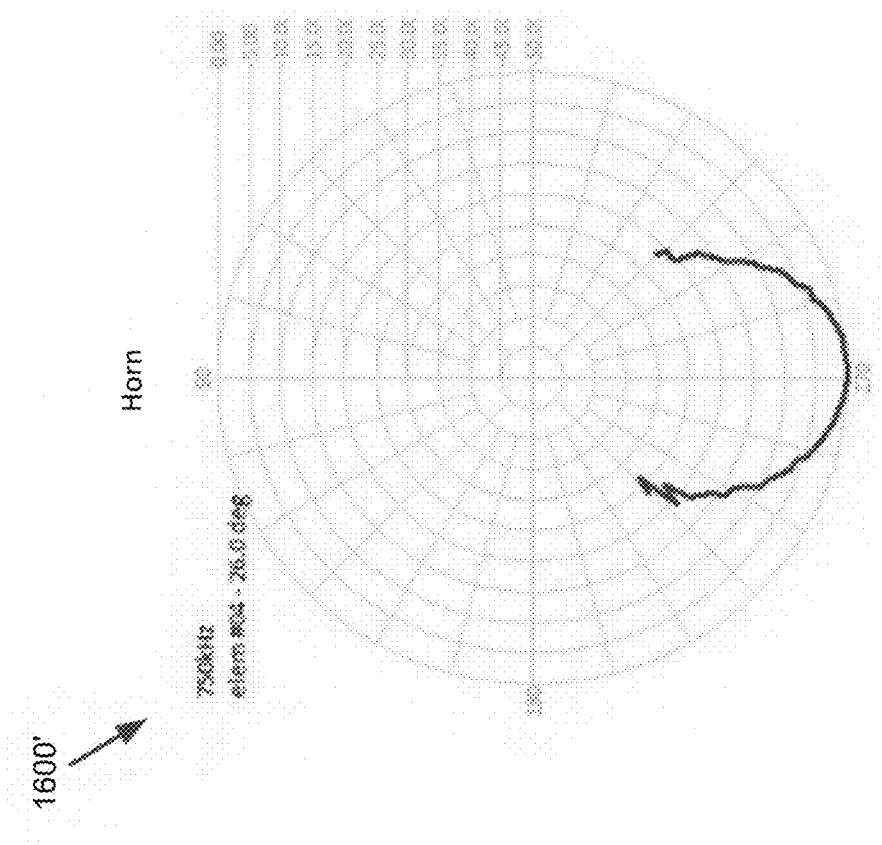
Figure 16A:
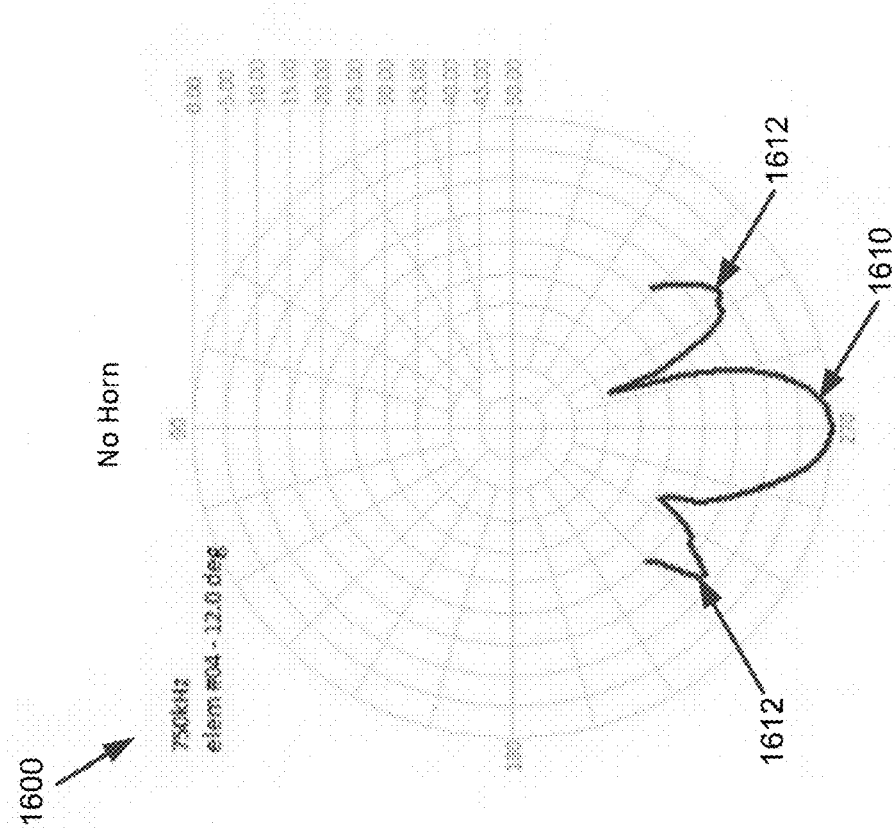
Figure 17A:
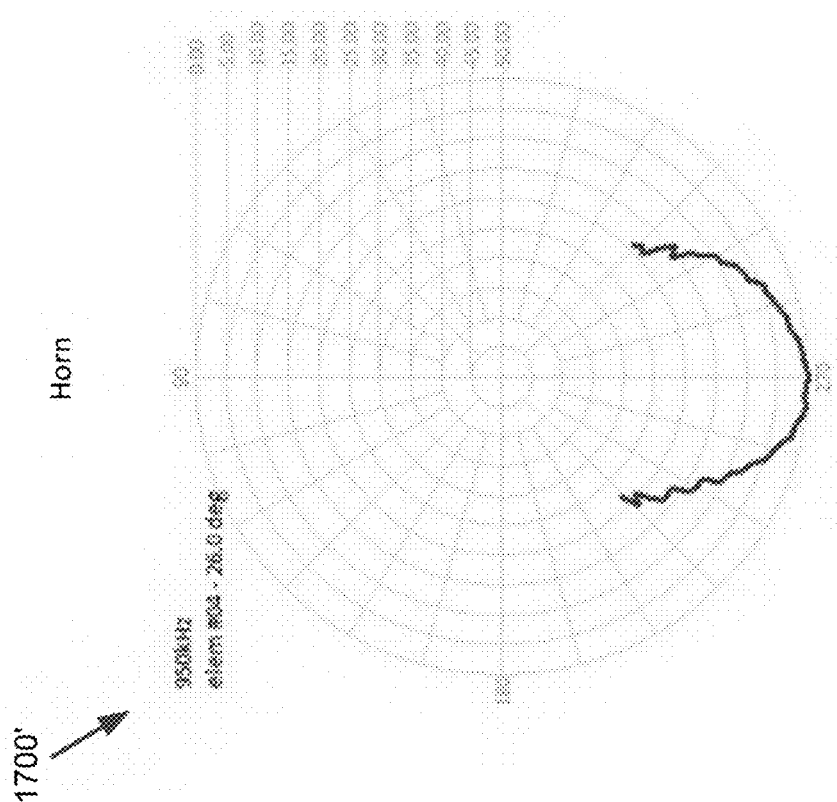
Figure 17B:
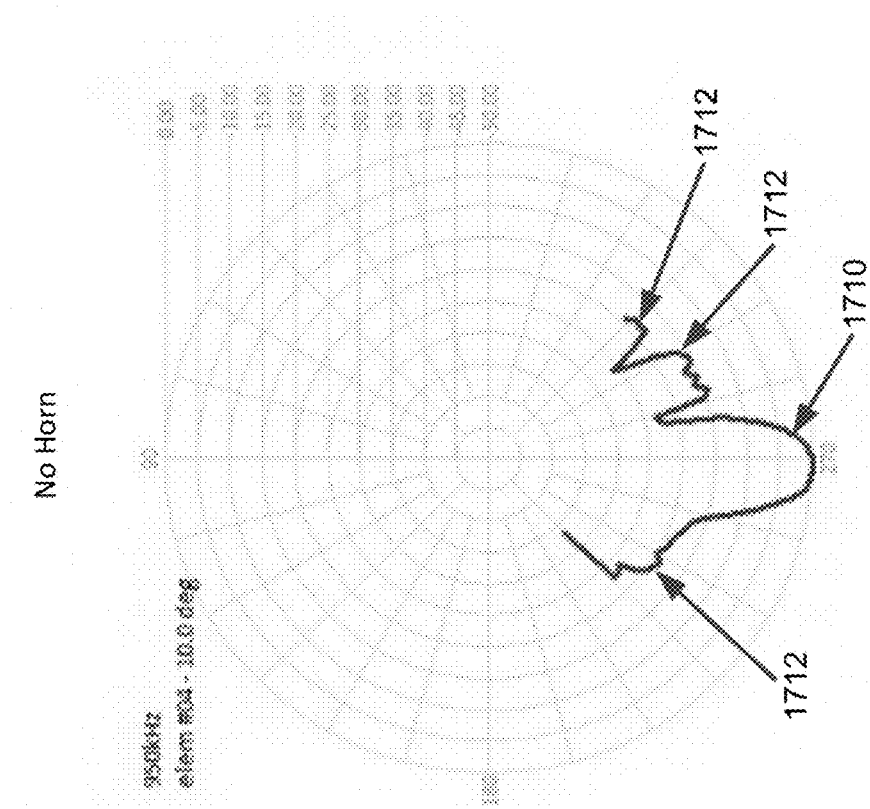
Figure 18:
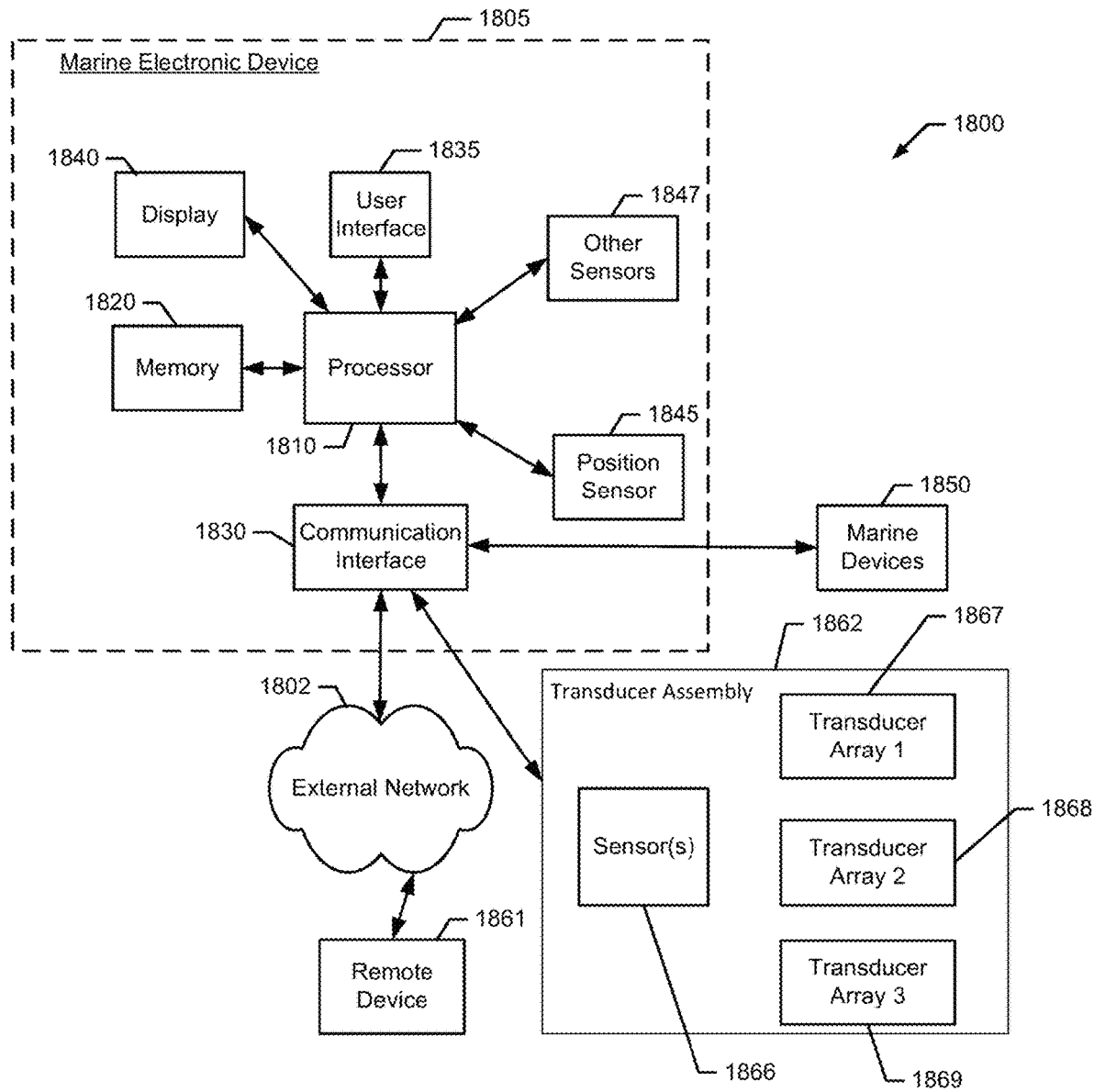
Figure 19:
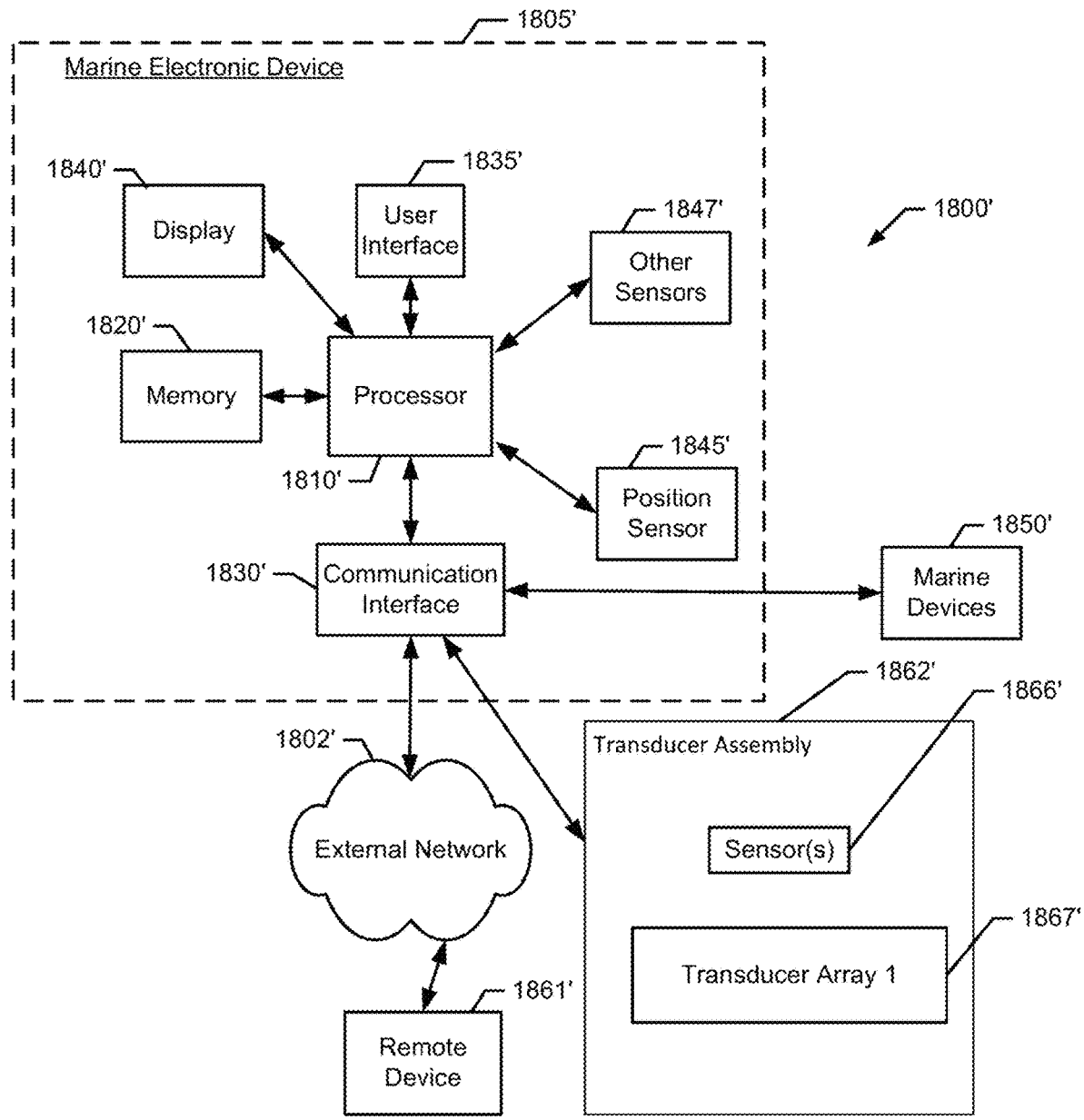
Figure 20:
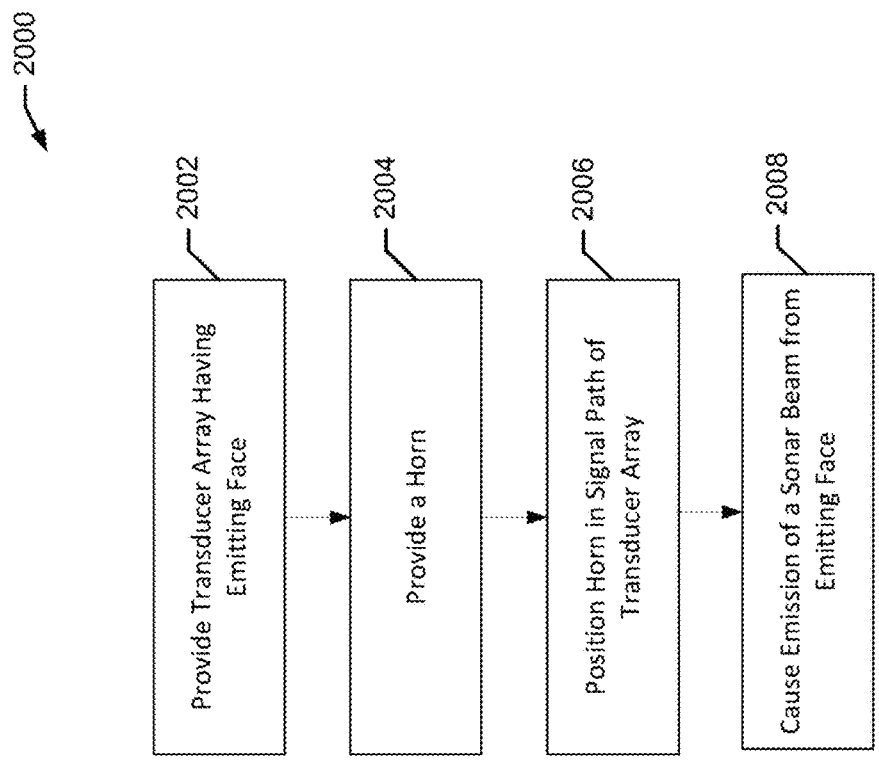

Having thus described the invention in general terms, reference will now be made to the accompanying drawings, which are not necessarily drawn to scale, and wherein:

FIG. 1 illustrates an example watercraft including various sonar transducer assemblies, in accordance with some embodiments discussed herein;

FIG. 2A illustrates an example array of transducer elements, in accordance with some embodiments discussed herein;

FIG. 2B illustrates a side view of the array of transducer elements shown in FIG. 2A, wherein an example first range of angles and an example second range of angles for beamformed sonar return beams are illustrated, in accordance with some embodiments discussed herein;

FIG. 2C illustrates an end view of the array of transducer elements shown in FIG. 2B along with illustrated ranges of angles of beamformed sonar return beams, in accordance with some embodiments discussed herein;

FIG. 3A illustrates three example arrays arranged to provide continuous sonar coverage utilizing beamformed sonar return beams, in accordance with some embodiments discussed herein;

FIG. 3B illustrates a first array shown in FIG. 3A along with its corresponding ranges of angles of beamformed sonar return beams, in accordance with some embodiments discussed herein;

FIG. 3C illustrates a second array shown in FIG. 3A along with its corresponding ranges of angles of beamformed sonar return beams, in accordance with some embodiments discussed herein;

FIG. 3D illustrates a third array shown in FIG. 3A along with its corresponding ranges of angles of beamformed sonar return beams, in accordance with some embodiments discussed herein;

FIG. 4 illustrates another example arrangement of three example arrays arranged to provide continuous sonar coverage utilizing beamformed sonar return beams, in accordance with some embodiments discussed herein;

FIG. 5A illustrates a perspective view of an example transducer assembly that includes three arrays, in accordance with some embodiments discussed herein;

FIG. 5B illustrates an exploded view of the example transducer assembly shown in FIG. 5A, in accordance with some embodiments discussed herein;

FIG. 5C illustrates a bottom perspective view of another example transducer assembly that includes three arrays, in accordance with some embodiments discussed herein;

FIGS. 6A-6B illustrate example mounting options for the example transducer assembly of FIG. 5A when mounted generally vertically, in accordance with some embodiments discussed herein;

FIGS. 7A-7B illustrate example mounting options for the example transducer assembly of FIG. 5A when mounted generally horizontally, in accordance with some embodiments discussed herein;

FIG. 8 illustrates a watercraft with an example transducer assembly utilizing three arrays to provide continuous sonar coverage, in accordance with some embodiments discussed herein;

FIG. 9 illustrates a schematic top plan view of the watercraft and sonar coverage shown in FIG. 8, in accordance with some embodiments discussed herein;

FIG. 10A illustrates a side schematic view of an example horn that is configured to reform the beam shape of a sonar beam generated by a sonar transducer element, in accordance with some embodiments discussed herein;

FIG. 10B illustrates a perspective schematic view of an example horn that is configured to reform the beam shape of a sonar beam generated by a sonar transducer element, in accordance with some embodiments discussed herein;

FIG. 10C illustrates a schematic view of an example horn and an expanded sonar beam, in accordance with some embodiments discussed herein;

FIG. 10D illustrates an example array of transducer elements, with an individual horn installed for each sonar transducer element, in accordance with some embodiments discussed herein;

FIG. 10E illustrates an example array of transducer elements, with a single horn is provided that expands the sonar beams generated for multiple sonar transducer elements, in accordance with some embodiments discussed herein;

FIG. 11A illustrates a side schematic view of an alternative horn that is configured to reform the beam shape of a sonar beam generated by a sonar transducer element, in accordance with some embodiments discussed herein;

FIG. 11B illustrates a perspective schematic view of an alternative horn that is configured to reform the beam shape of a sonar beam generated by a sonar transducer element, in accordance with some embodiments discussed herein;

FIGS. 12A-12B illustrate various perspective views of another alternative horn that is used to reform the beam shape of a sonar beam generated by a sonar transducer element, in accordance with some embodiments discussed herein;

FIG. 13 illustrates an example sleeve that is configured to be secured on a transducer assembly, in accordance with some embodiments discussed herein;

FIG. 14A illustrates an example sonar transducer assembly with three sonar transducer arrays that, together, provide 135 degrees of coverage, in accordance with some embodiments discussed herein;

FIG. 14B illustrates an example marine electronic device presenting a sonar image with high resolution, wherein the sonar image is formed using sonar return data similar to the sonar transducer assembly of FIG. 14A, in accordance with some embodiments discussed herein;

FIG. 15A illustrates transverse beam patterns generated by a sonar transducer array at various frequencies where no horn is used, in accordance with some embodiments discussed herein;

FIG. 15B illustrates transverse beam patterns generated by a sonar transducer array at various frequencies where a horn is used, in accordance with some embodiments discussed herein;

FIG. 16A illustrates a transverse beam pattern generated by a sonar transducer array at a frequency of 750 kHz where no horn is used, in accordance with some embodiments discussed herein;

FIG. 16B illustrates a transverse beam pattern generated by a sonar transducer array at a frequency of 750 kHz where a horn is used, in accordance with some embodiments discussed herein;

FIG. 17A illustrates a transverse beam pattern generated by a sonar transducer array at a frequency of 950 kHz where no horn is used, in accordance with some embodiments discussed herein;

FIG. 17B illustrates a transverse beam pattern generated by a sonar transducer array at a frequency of 950 kHz where a horn is used, in accordance with some embodiments discussed herein;

FIG. 18 is a block diagram of an example sonar system, in accordance with some embodiments discussed herein;

FIG. 19 is a block diagram of another example sonar system, in accordance with some embodiments discussed herein; and FIG. 20 illustrates a flowchart of an example method of operating a sonar system with a horn according to some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout.

FIG. 1 illustrates an example watercraft including various sonar transducer assemblies, in accordance with some embodiments discussed herein. FIG. 1 illustrates an example watercraft 100 including various marine devices, in accordance with some embodiments discussed herein. As depicted in FIG. 1, the watercraft 100 (e.g., a vessel) is configured to traverse a marine environment, e.g. body of water 101, and may use one or more sonar transducer assemblies 102a, 102b, and 102c disposed on and/or proximate to the watercraft. Notably, the example watercraft contemplated herein may be surface watercraft, submersible watercraft, or any other implementation known to those skilled in the art. The transducer assemblies 102a, 102b, and 102c may each include one or more transducer elements (such as in the form of the example arrays described herein) configured to transmit sound waves into a body of water, receive sonar returns from the body of water, and convert the sonar returns into sonar return data.

Depending on the configuration, the watercraft 100 may include a primary motor 105, which may be a main propulsion motor such as an outboard or inboard motor. Additionally, the watercraft 100 may include a trolling motor 108 configured to propel the watercraft 100 or maintain a position. The one or more transducer assemblies (e.g., 102a, 102b, and/or 102c) may be mounted in various positions and to various portions of the watercraft 100 and/or equipment associated with the watercraft 100. For example, the transducer assembly may be mounted to the transom 106 of the watercraft 100, such as depicted by transducer assembly 102a. The transducer assembly may be mounted to the bottom or side of the hull 104 of the watercraft 100, such as depicted by transducer assembly 102b. The transducer assembly may be mounted to the trolling motor 108, such as depicted by transducer assembly 102c.

The watercraft 100 may also include one or more marine electronic devices 160, such as may be utilized by a user to interact with, view, or otherwise control various aspects of the various sonar systems described herein. In the illustrated embodiment, the marine electronic device 160 is positioned proximate the helm (e.g., steering wheel) of the watercraft 100 although other places on the watercraft 100 are contemplated. Likewise, additionally or alternatively, a user's mobile device may include functionality of a marine electronic device.

The watercraft 100 may also comprise other components within the one or more marine electronic devices 160 or at the helm. For example, the watercraft 100 may have a radar, an AIS transceiver, a direction sensor, a camera, and these components may each positioned at or near the helm (although other positions relative to the watercraft are also contemplated). Additionally, the watercraft 100 comprises a rudder 110 at the stern of the watercraft 100, and the rudder 110 may be positioned on the watercraft 100 so that the rudder 110 will rest in the body of water 101. In other embodiments, these components may be integrated into the one or more electronic devices 160 or other devices. Other example devices such as a temperature sensor, a wind sensor, one or more speakers, and various vessel devices/features (e.g., doors, bilge pump, fuel tank, etc.) may be used.

FIGS. 2A-2C illustrate an example array 220 of transducer elements 208 that may be utilized with various embodiments of the present invention, such as within an example transducer assembly described herein. In some embodiments, the transducer array 220 may include a plurality of transducer elements 208 arranged in a line and electrically connected relative to each other. For example, the transducer elements 208 may be individually positioned on a printed circuit board (PCB). The PCB may mechanically support and electrically connect the electronic components, including the transducer elements using conductive tracks (e.g. traces), pads, and other features. The conductive tracks may comprise sets of traces; for example, each transducer elements may be mounted to the PCB such that the transducer element is in electrical communication with a set of traces. Each transducer element, sub-array, and/or the array of transducer elements may be configured to transmit one or more sonar pulses and/or receive one or more sonar return signals. Unless otherwise stated, although FIGS. 2A-2C illustrate a linear array with transducer elements of a certain shape, different types of arrays (or sub-arrays), transducer elements, spacing, shapes, etc. may be utilized with various embodiments of the present invention.

In the illustrated embodiment shown in FIG. 2A, the sonar transducer array 220 includes an emitting face 221 with a length LA and a width WA, where the length is greater than the width. Within the array 220, each transducer element 208 defines an emitting face 209 with a length LT and a width WT, where the length is greater than the width. The length of each transducer element 208 is perpendicular to the length of the emitting face 221. Each transducer element 208 is spaced at a predetermined distance from an adjacent transducer element, which may be designed based on desired operating characteristics of the array 220, such as described herein. Sonar transducer arrays 220 may comprise one or more sonar transducer elements 208, and, in some embodiments, the sonar transducer array 220 may have only one sonar transducer element 208. The sonar transducer arrays may be configured to operate at a frequency between 400 kHz and 1300 kHz in some embodiments. In some embodiments, the sonar transducer arrays are configured to operate at a frequency of between 550 kHz and 1100 kHz.

In some embodiments, the array 220 of transducer elements 208 is configured to operate to transmit one or more sonar beams into the underwater environment. Depending on the configuration and desired operation, different transmission types of sonar beams can occur. For example, in some embodiments, the array 220 may transmit sonar beams according to a frequency sweep (e.g., chirp sonar) so as to provide sonar beams into the underwater environment. In some embodiments, the array 220 may be operated to frequency steer transmitted sonar beams into various volumes of the underwater environment. In some embodiments, the array 220 may be operated to cause a broadband transmit sonar beam to be sent into the underwater environment. Depending on the frequency used and phase shift applied between transducer elements, different volumes of the underwater environment may be targeted.

In some embodiments, the array 220 may be configured to receive sonar return signals. The way the sonar return signals are received and/or processed may vary depending on the desired sonar system configuration. FIGS. 2B-2C illustrate the array 220 with example possible sonar return beam coverage according to various example embodiments. In this regard, in some embodiments, each of the plurality of transducer elements are configured to operate at a fixed phase shift (e.g., at one of 0°, $\pi/2$ radian, $\pi/4$ radian, or $\pi/8$ radian) and vary in frequency (e.g., between 500 kHz-1200 kHz). This processing approach beamforms multiple sonar return beams (e.g., beam 280) between a first range of angles ($\theta_1$) 281 and between a second range of angles ($\theta_2$) 282. To explain, the sonar returns may be received by the array 220 and filtered into frequency bins based on the frequency of the signal. From that, sonar return beams 280 can be determined that provide sonar returns within a small angle window (e.g., 0.5° to 1°, although greater or lesser angle windows are contemplated). Since the mounting orientation with respect to the watercraft can be known, and the frequency is known, then the relative angle with respect to the waterline (or other reference) can be determined and used to form sonar imagery, as described herein.

With further reference to FIG. 2B, the sonar return beams (e.g., 280) can be "steered" (e.g., along arrow R) within the first range of angles 281 based on varying the frequency (e.g., between 291a and 291b). Likewise, the sonar return beams can be "steered" within the second range of angles 282 based on varying the frequency (e.g., between 292a and 292b). By operating the transducer elements at a fixed phase shift, the two range of angles 281, 282 can be covered with sonar beams, but there is also a gap (e.g., indicated by the range of angles β) that is not able to be covered by the frequency steered sonar return beams.

Without being bound by theory, a perhaps simplified explanation of this can be based on considering a single beam shape that is formed by a receipt event of the array. The beam shape is formed of a rather wide main beam lobe, along with at least one relatively small defined side lobe (e.g., the beam 280) that extends outwardly therefrom. By operating at a fixed phase shift and ignoring the main beam lobe, the sonar return signals received within the side lobe can be determined. Further, changing the frequency causes a shifting of the direction of the side lobe among the range of angles (281 or 282). Since the side lobe is symmetrical about the main lobe, there are two ranges of angles that are symmetrical about the facing direction $D_{FD}$ of the emitting face 221 of the array 220.

Further information regarding beamforming, including frequency steered beamforming, can be found, for example, in the following: U.S. Pat. No. RE45,379, entitled "Frequency Division Beamforming for Sonar Arrays"; U.S. Pat. No. 10,114,119, entitled "Sonar Systems using Interferometry and/or Beamforming for 3D Imaging"; U.S. Pat. No. 9,739,884, entitled "Systems and Associated Methods for Producing a 3D Sonar Image"; and U.S. patent application Ser. No. 16/382,639, published as U.S. Publication No. 2019/0265354, and entitled "Sonar Transducer Having Geometric Elements"; the contents of each hereby being incorporated by reference in their entireties.

Depending on various factors, different beam shapes can be achieved and different ranges of angles can be achieved. The following describes some example factors that can be varied to effect the beam shapes and different ranges of angles: the number of transducer elements, the size/shape of the transducer elements, the size/shape of the array, the fixed phase shift, the frequency range, among other things. An example embodiment produces a first range of angles spanning ~22.5° and a second range of angles spanning ~22.5° with a gap of range of angles of ~45° therebetween. Additionally, sonar return beams of ~0.5°-1° are formed. Further, with reference to FIG. 2C, a transverse beamwidth $\theta_3$ of ~20° is formed (although other transverse beamwidths are contemplated such as between ~9° and 27°). Some example embodiments that may achieve such example beam shapes include an array length of between ~100-150 mm; an array width of between ~3-10 mm; an array thickness of between ~1-3 mm; a number of transducer elements of between 50-200; a width of the transducer element of between ~0.4-1 mm; and a length of the transducer element of between ~2-10 mm (although outside of these ranges is also contemplated).

In some embodiments, the system may be configured to utilize more than one array, where the arrays are oriented relative to each other to increase coverage volume of the underwater environment. For example, in some embodiments, a second (or more) array(s) can be added and tilted relative to the first array such that the gap within the first array is "covered" by one or more of the range of angles of sonar return beams from such array(s). FIG. 3A illustrates an example three array assembly 310 that is designed to provide continuous sonar coverage utilizing beamformed sonar return beams. The sonar assembly 310 includes a first array 340, a second array 330, and a third array 320. The first array 340 (shown by itself in FIG. 3B), is oriented with a facing direction (e.g., substantially straight down relative to the figure) so as to produce a first range of angles 341 and a second range of angles 342 (with a gap in between). The second array 330 (shown by itself in FIG. 3C), is oriented with a facing direction at an angle (e.g., ~22.5° relative to the facing direction of the first array 340) so as to produce a first range of angles 331 and a second range of angles 332 (with a gap in between). The third array 320 (shown by itself in FIG. 3D), is oriented with a facing direction at another angle (e.g., ~45° relative to the facing direction of the first array 340) so as to produce a first range of angles 321 and a second range of angles 322 (with a gap in between). As so arranged, the gaps between each set of the two range of angles are covered by a range of angles from each of the other two arrays. The illustrated example thus provides continuous sonar beam coverage for ~135°.

FIG. 4 illustrates another example transducer assembly 510 that includes an arrangement of three arrays arranged to provide continuous sonar coverage utilizing beamformed sonar return beams. Notably, while the first array 540 and the third array 520 are mounted and oriented similarly to the first and third arrays of the transducer assembly 310 of FIG. 3, the second array 530 of the transducer assembly 510 has been shifted (e.g., offset) while maintaining its relative angle orientation (e.g., it is still mounted with a facing direction at an angle (e.g., ~22.5°) relative to the facing direction of the first array—just as in the transducer assembly 310). Thus, the transducer assembly 510 forms an "X" configuration for the first array 540 and the third array 520, but also has a line "_" at the bottom of the "X" corresponding to the second array 530. Notably, the same relative continuous sonar beam coverage is obtained (e.g., as the small relative shift from the centerpoint 315 in FIG. 3A does not significantly change the resulting beam coverage—particularly with respect to the distance covered in the underwater environment). For explanatory purposes, the various ranges of angles are shown extending from a slightly revised centerpoint 515.

FIG. 5A illustrates an example transducer assembly 602 including a housing 605 that houses the three arrays 620, 630, 640 (which are shown in exploded view in FIG. 5B). Notably, the housing 605 includes one or more mounting features (e.g., a ratchet-type mounting feature 604 for enabling secured attachment in different orientations). The cable 606 provides a safe channel for running various wires 607 used in conjunction with the arrays. Notably, the X plus line configuration of the arrays enables some benefits for the transducer assembly 602. For example, the housing 605 of the transducer assembly 602 may maintain a small footprint and still provide a straight bottom that enables a user to more easily comprehend the position of the center array (and, thus, determine and orient the transducer assembly 602 properly with respect to the watercraft for the desired coverage). With reference to FIG. 5B, the PCB 609 and the electrical connectors 603 are also shown for electrically connecting the arrays 620, 630, and 640. FIG. 5C illustrates an example transducer assembly 602' shown in an orientation that would provide similar beam coverage as shown in FIG. 4.

FIGS. 6A and 6B illustrates a transducer assembly 802 mounted to a pole 810 (e.g., a shaft of a trolling motor) using a mounting arm 806. The mounting arm 806 attaches via a fastener to the transducer assembly 802 at a first end 807 and to the pole 810 via a clamp 808 at a second end 805. The mounting arm 806 includes a bend that enables the transducer assembly 802 to be spaced from the pole 810 and oriented as desired (e.g., facing generally downward along arrow G). FIG. 6B illustrates the transducer assembly 802 mounted to the trolling motor housing 812 via a strap and clamp 804. The transducer assembly 802 may be oriented as desired (e.g., facing generally downward along the arrow G).

FIGS. 7A and 7B illustrate the transducer assembly 902 mounted in a different orientation. In FIG. 7A, the transducer assembly 902 is mounted to a pole 910 (e.g., a shaft of a trolling motor) using a mounting arm 906. The mounting arm 906 attaches via a fastener to the transducer assembly 902 at a first end 907 and to the pole 910 via a clamp 908 at a second end 905. The mounting arm 906 includes a bend that enables the transducer assembly 902 to be spaced from the pole 910 and oriented as desired (e.g., facing generally forward along arrow J). FIG. 7B illustrates the transducer assembly 902 mounted to the trolling motor housing 912 via a strap and clamp 904. The transducer assembly 902 may be oriented as desired (e.g., facing generally forward along the arrow J).

FIG. 8 illustrates a watercraft 100 with an example transducer assembly 702 utilizing three arrays to provide continuous sonar coverage 705 in the forward and downward directions relative to the watercraft 100. In this regard, the three arrays work together to provide corresponding ranges of angles 721, 722, 731, 732, 741, 742—similar to those shown and described with respect to FIG. 4. In the illustrated embodiments, the lengths of each of the emitting faces of the three arrays extend in the fore-to-aft direction of the watercraft.

As indicated herein, the frequency of the sonar return beams can be varied to provide a sonar return beam 706 that can sweep (e.g., along arrow A) within the sonar beam coverage 705 (e.g., across the three arrays)—to capture sonar return signals along the sonar beam coverage. FIG. 9 illustrates the sonar beam coverage 705 from a top view (with the beam coverage 705 projected onto a seafloor). As illustrated the sonar return beam 706 would sweep (e.g., along arrow B) across the sonar beam coverage 705.

In various example embodiments, a horn is provided that is configured to reform a sonar beam generated by a sonar transducer element or array in several beneficial ways. For example, (a) the horn may expand the field of view or angular coverage of a sonar transducer element/array along the transverse direction; (b) the horn may provide more consistent beam shapes regardless of variation in the operating frequency for the sonar transducer element/array; and (c) the horn may maintain the signal intensity at a more consistent level across a range of angles. FIG. 10A illustrates a side schematic view of an example horn assembly 1002 that is configured to reform the beam shape of a sonar beam generated by a sonar transducer element 1008. FIG. 10B illustrates the example horn assembly 1002 of FIG. 10A from a perspective view. The horn 1002 has a first diffraction surface 1004a and a second diffraction surface 1004b. The diffraction surfaces 1004a, 1004b may possess a curved and/or convex shape as illustrated. A sonar transducer element 1008 is also provided. This sonar transducer element 1008 may comprise an emitting face 1010. The first diffraction surface 1004a and the second diffraction surface 1004b are configured so that they will be positioned in a path of the sonar beam when the horn 1002 is appropriately positioned, thereby reforming the beam shape of a sonar beam that emanates from the emitting face 1010. In the illustrated embodiment, the horn 1002 is configured to expand the transverse beam width or the field of view of a beam generated by sonar transducer element 1008.

As illustrated in FIG. 10C, the horn 1002 may increase the range of angles from $\theta_A$ to $\theta_B$. As will be described further below, the horn 1002 may also be configured to maintain a more consistent beam shape regardless of the frequency at which the sonar transducer element 1008 is operating, and the horn 1002 may also maintain a more consistent intensity of sonar transducer signals across the range of angles within the beam path. FIG. 10C illustrates a schematic view of an example horn and an expanded sonar beam generated by the horn, in accordance with some embodiments discussed herein. As illustrated, the sonar transducer element 1008 generates a range of angles that create a signal path 1081a. A horn 1002 is introduced into the signal path 1081a of the sonar beam generated by the sonar transducer element 1008. The horn 1002 comprises at least one diffraction surface. Notably, the illustrated horn 1002 comprises two diffraction surfaces 1004a, 1004b. The diffraction surfaces 1004a, 1004b may be introduced into the signal path 1081a. The diffraction surfaces 1004a, 1004b may possess a curved and/or convex shape as illustrated in FIG. 10C. By placing the horn 1002 or a diffraction surface 1004a, 1004b of the horn 1002 in the signal path 1081a, the signal path 1081a may be reformed. The convex diffraction surfaces 1004a, 1004b may be positioned opposite each other across the path 1081a of the sonar beam, and each of the curved, convex diffraction surfaces 1004a, 1004b may be configured to protrude outwardly into the path 1081a of the sonar beam. As illustrated, the signal path 1081a is reformed to generate a new signal path 1081b with an expanded range of angles $\theta_B$. The horn 1002 may also affect the sonar beam in other ways, maintaining the signal intensity at a more consistent level across the range of angles and maintaining more consistent beam shapes regardless of variation in the operating frequency for the sonar transducer element 1008. The horn 1002 may also be shaped to redirect the beam such that the center of the beam is guided away at an angle relative to the normal of the radiating surface. For example, the horn 1002 may form a sound path that may reform the sonar beam to travel along the sound path (e.g., turning one or more times, expanding and retracting one or more times, redirecting the emission direction of the center of the beam, etc.).

The horn 1002 may comprise a variety of materials. In one embodiment, the horn 1002 comprises rubber material. In some embodiments, the horn 1002 may comprise a soft close-cell foam rubber sheet. The horn 1002 provides a cost-effective solution for expanding the angular coverage of a sonar beam in the transverse direction.

FIGS. 10A and 10B illustrate a horn 1002 that wraps around the sonar transducer element 1008, leaving only the emitting face 1010 uncovered. However, in other embodiments, a horn may be provided that does not wrap around the sonar transducer element/array and, in some cases, is not even attached to the sonar transducer element/array.

FIG. 10D provides an example assembly 1020' where each individual sonar transducer element 1008' has its own a horn 1002'. However, a single horn assembly 1002 may also be utilized with a sonar transducer array having multiple sonar transducer elements so that the single horn assembly 1002 reforms the beam shape of sonar beams generated by multiple sonar transducer elements. Along these lines, in the embodiment illustrated in FIG. 10E, an assembly 1020" includes a single horn 1002''' that is configured to rest within the path of the sonar beams generated by multiple sonar transducer elements 1008". In other embodiments, a plurality of horns may be configured to rest within the path of a single sonar beam.

FIGS. 10A-10B also illustrate a horn assembly 1002 where the diffraction surfaces 1004a and 1004b abut the emitting face 1010 of the sonar transducer element 1008. However, this is not the case in all embodiments. For example, FIGS. 11A-11B illustrate a side and a perspective schematic view of an alternative embodiment. In this alternative embodiment, the diffraction surfaces 1104a and 1104b of the horn are configured so that they will be positioned at a distance DD away from the emitting face 1110 of the sonar transducer element 1108.

FIGS. 12A-12B illustrate various perspective views of another alternative horn that is used to reform the beam shape of a sonar beam generated by a sonar transducer array. As illustrated, the horn 1202 is provided having a first diffraction surface 1204a and a second diffraction surface 1204b. A sonar transducer array 1208 is also shown having an emitting face 1210. The horn 1202 is configured to wrap around the sonar transducer array 1208, leaving only the emitting face 1210 uncovered. Similar to the diffraction surfaces described in reference to FIGS. 10A, 10B, 11A, and 11B, the first diffraction surface 1204a and the second diffraction surface 1204b are configured so that they will be positioned in a path of the sonar beam when the horn 1202 is appropriately positioned, thereby reforming the beam shape of a sonar beam. In the illustrated embodiments in FIGS. 12A-12B, the horn is configured to expand the transverse beam width of the sonar transducer element 1208.

In some embodiments, the horn may be part of a sleeve that is fitted over a transducer assembly housing (e.g., assembled during manufacturing and/or retrofitted). In this regard, a sleeve comprising one or more horns may be used in some cases to permit simple assembly with a sonar transducer assembly. FIG. 13 illustrates an example sleeve 1320 that is configured to be secured on a transducer assembly 1302. A transducer assembly 1302 is illustrated having a first sonar transducer array 1304a oriented in a first direction, a second sonar transducer array 1304b oriented in a second direction, and a third sonar transducer array 1304c (not visible in FIG. 13) oriented in a third direction. The sleeve 1320 is provided, and this sleeve 1320 defines a recess in its internal volume. This recess may be sized to permit the sleeve 1320 to fit securely around the outside surface of the transducer assembly 1302. In some embodiments, fasteners may be used to secure the sleeve 1320 onto the transducer assembly 1302. The sleeve 1320 may define a first horn 1322a that is configured to be secured adjacent to the first sonar transducer array 1304a when the sleeve 1320 is secured on the transducer assembly 1302. The sleeve 1320 may define a second horn 1322b that is configured to be secured adjacent to the second sonar transducer array 1304b when the sleeve 1320 is secured on the transducer assembly 1302. Additionally, the sleeve 1320 may define a third horn 1322c (not visible in FIG. 13) that is configured to be secured adjacent to the third sonar transducer array 1304c (not visible in FIG. 13) when the sleeve 1320 is secured on the transducer assembly 1302. Each of the horns 1322a, 1322b, 1322c (not visible) within the sleeve 1320 have a recess 1324a, 1324b, 1324c (not visible), and these recesses are configured to permit sonar beams generated by the respective sonar transducer arrays to pass through the sleeve 1320. However, in some embodiments, an acoustically transparent housing may be provided instead of recesses 1324a, 1324b, 1324c. By providing the first horn 1322a, the second horn 1322b, and the third horn 1322c (not visible), the beam shape generated by the first sonar transducer array 1304a, second sonar transducer array 1304b, third sonar transducer array 1304c (not visible) may be reformed as desired.

While previous systems allow sonar data to be displayed, the sonar data may lack a desired level of clarity. This may occur because, with changes in angle and operating frequency, the beam shape generated by the sonar transducer element varied greatly. FIGS. 14A and 14B demonstrate these issues. FIG. 14A illustrates an exemplary beam pattern formed by a sonar transducer assembly 1402. The sonar transducer assembly 1402 has a first sonar transducer array 1404a, a second sonar transducer array 1404b, and a third sonar transducer array 1404c. Each sonar transducer array is configured to generate two sonar beams having certain sonar coverage areas. By operating the sonar transducer arrays 1404a, 1404b, 1404c at a fixed phase shift, each sonar transducer array may cover two different sonar coverage areas with a gap therebetween. The first sonar transducer array 1404a is configured to generate a first sonar beam having a first sonar coverage area 1408a as well as a second sonar beam having a second sonar coverage area 1408b. The second sonar transducer array 1404b is configured to generate a first sonar beam having a first sonar coverage area 1410a as well as a second sonar beam having a second sonar coverage area 1410b. The third sonar transducer array 1404c is configured to generate a first sonar beam having a first sonar coverage area 1412a as well as a second sonar beam having a second sonar coverage area 1412b. Notably, with reference to FIG. 14B, the corresponding, resulting sonar images from the coverage areas are shown following the order from left to right 1412a', 1408a', 1410a', 1412b', 1408b', and 1410b'. By using these various sonar transducer arrays, effective coverage may be maintained across a large area.

Sonar return beams can be "steered" within the particular sonar coverage areas by varying the frequency. In some embodiments, the frequency may vary from 400 kHz to 1300 kHz. In other embodiments, such as the one illustrated in FIG. 14A, the frequency may vary from 550 kHz to 1050 kHz. As shown in FIG. 14A, when a transition occurs between two sonar coverage areas, the frequency will also be significantly different. For example, at the transition between sonar coverage area 1408a and sonar coverage area 1410a, the frequency drops from 1050 kHz in sonar coverage area 1408a to 550 kHz in sonar coverage area 1410a.

In previous systems, the beam shape formed by a transducer operating at different frequencies could change drastically. The different frequencies often led to inconsistent beam shapes for the two sonar coverage areas, which in turn caused blurry images at transitions between two adjacent sonar coverage areas.

FIG. 14B illustrates an example display 1450 that is presenting a sonar return image on the screen 1452. In this image, sonar data for each of the sonar coverage areas are compiled onto a single screen 1452 so that the information can be easily understood by the end user. The radial lines 1414 within FIG. 14B represent the transitions between two adjacent sonar coverage areas.

Where a horn is used, the beam shapes generated will be more consistent regardless of the frequency. Thus, where the frequency varies between 550 kHz and 1050 kHz, the beam shape formed at 550 kHz will be more similar with the beam shape formed at 1050 kHz and, therefore, the resulting live images generated on a display will be clearer. The live images will be particularly less blurry at the radial lines where transitions occur. While the frequencies of 550 kHz and 1050 kHz are used herein, these frequencies are merely examples used for the purposes of explanation, and other frequencies may also be used. For example, the frequency may vary from 400 kHz to 1300 kHz.

FIGS. 15A and 15B demonstrate the differences in beam patterns that arise in situations where no horn is used and in situations where a horn is used. The chart shown in FIGS. 15A and 15B illustrate the intensity of sonar signals at angles ranging from 0 to 360 degrees, with the intensity measured in decibels. FIGS. 15A and 15B illustrate beam patterns formed at several different frequencies all on the same chart. However, beam patterns may be seen at individual frequencies in subsequent figures.

FIG. 15A illustrates beam patterns 1500 with a main lobe 1510. This main lobe 1510 provides signals at the highest intensity, with the peak intensity being −5 dB to 5 dB depending on the frequency used. The main lobe 1510 generally extends from 80 degrees to 100 degrees. Various side lobes 1512 are also formed. These side lobes 1512a and 1512b have a much lower signal intensity than the main lobe 1510, and the signal intensity at the side lobes 1512a, 1512b can vary greatly. For example, for the side lobe 1512a illustrated to the left of the main lobe 1510, the intensity varies between −30 dB and −10 dB. This large variation can cause resulting sonar images presented on a display to be blurry as noted above, and the variation can lead cause the information presented on the display to be less accurate.

FIG. 15B illustrates transverse beam patterns 1500' generated by a sonar transducer array at various frequencies where a horn is used. Where a horn is used, the signal intensity is much more consistent with variation of the angle. As such, FIG. 15B substantially removes any distinct side lobes. Additionally, the horn results in more consistent intensities at angled positions. The horn may result in decreased intensities at more extreme side angles and may also result in increased intensities at angles more proximate to the angle of 90 degrees. For example, at an angle of 60 degrees or 120 degrees and a frequency of 1100 kHz in FIG. 15A, the signal intensity is around −14 dB. By contrast, at an angle of 60 degrees or 120 degrees, the signal intensity is approximately −6 dB when operating at 1100 kHz in FIG. 15B. Thus, the signal intensity is increased significantly at these side angles where a horn is used. Furthermore, at more extreme angles such as 30 degrees or 150 degrees the signal intensity may actually be reduced by using a horn. Thus, the horn provides a more consistent beam shape.

FIG. 16A illustrates a transverse beam pattern 1600 generated by a sonar transducer array at a single frequency of 750 kHz where no horn is used, and FIG. 16B illustrates a transverse beam pattern 1600' generated by a sonar transducer array at a single frequency of 750 kHz where a horn is used. As stated above, the introduction of a horn results in a much more consistent beam shape, with the intensity of signals being more uniform despite variations in the angle. Where no horn is used, a main lobe 1610 and two distinct side lobes 1612 are formed. Where no horn is used, the signal intensity varies greatly. For example, the following table illustrates the significant variation in intensity:

TABLE 1

Intensities shown in FIG. 16A

| Angle (degrees) | Intensity (dB) |
|---|---|
| 230 | −10 |
| 245 | −25 |
| 270 | 0 |
| 290 | −34 |
| 305 | −10 |

By contrast, where a horn is used in FIG. 16B, the horn causes the signals to be provided at more uniform signals, and no main lobe and distinct side lobes are formed. For example, the following table shows the increased consistency in intensities:

TABLE 2

Intensities shown in FIG. 16B

| Angle (degrees) | Intensity (dB) |
|---|---|
| 225 | −25 |
| 230 | −20 |
| 240 | −13 |
| 245 | −10 |
| 255 | −4 |
| 270 | 0 |
| 285 | −3 |
| 290 | 5 |
| 300 | −12.5 |
| 305 | −15 |
| 315 | −20 |

The use of a horn results in more consistent beam shapes regardless of the frequency at which the sonar transducer element or array is operating. This is further demonstrated in FIGS. 17A and 17B. FIG. 17A illustrates a transverse beam pattern 1700 generated by a sonar transducer array at various frequencies where no horn is used. FIG. 17B illustrates a transverse beam pattern 1700' generated by a sonar transducer array at various frequencies where a horn is used. In each of these figures, the sonar transducer element is operating at a frequency of 950 kHz. Again, introducing the horn results in more consistent beam shapes. In FIG. 17B, the horn is configured to provide an intensity of over −20 dB for a field of view of 60 degrees when a sonar transducer array is operating at a frequency of 950 kHz.

A comparison of the beam shape illustrated in FIGS. 16A and 17A further demonstrates the increased consistency provided by the use of a horn. FIG. 16A illustrates a main lobe 1610 and two distinct side lobes 1612. By contrast, FIG. 17A illustrates a main lobe 1710 and several side lobes 1712 that are much less distinct. The beam shapes are especially inconsistent for angles ranging between 270 degrees and 225 degrees.

While the beam shapes vary greatly where no horn is used, the beam shapes are very consistent where a horn is used. This is demonstrated by a comparison of FIGS. 16B and 17B. In FIG. 16B, the sonar transducer element or array is operating at a frequency of 750 kHz, and a frequency of 950 kHz is utilized in FIG. 17B. Despite utilizing different frequencies, the beam shapes presented in FIGS. 16B and 17B are extremely similar.

These results occur where a sonar transducer array is attached, either directly or indirectly, to a watercraft to provide sonar return data. Notably, similar results are contemplated for a utilizing a horn with a single element.

Example System Architecture

FIG. 18 is a block diagram of an example sonar system 1800 of various embodiments of the present invention described herein.

The illustrated system 1800 includes a marine electronic device 1805. The system 1800 may comprise numerous marine devices 1850. A transducer assembly 1862, a radar, a rudder, a primary motor, a trolling motor, and additional sensors/devices may be provided as marine devices, but other marine devices may also be provided. One or more marine devices may be implemented on the marine electronic device 1805 as well. For example, a position sensor 1845, a direction sensor, an autopilot, and other sensors 1847 may be provided within the marine electronic device 1805. These marine devices can be integrated within the marine electronic device 1805, integrated on a watercraft at another location and connected to the marine electronic device 1805, and/or the marine devices may be implemented at a remote device 1861 in some embodiments. The system 1800 may include any number of different systems, modules, or components; each of which may comprise any device or means embodied in either hardware, software, or a combination of hardware and software configured to perform one or more corresponding functions described herein.

The marine electronic device 1805 may include at least one processor 1810, a memory 1820, a communication interface 1830, a user interface 1835, a display 1840, autopilot, and one or more sensors (e.g. position sensor 1845, direction sensor, other sensors 1847). One or more of the components of the marine electronic device 1805 may be located within a housing or could be separated into multiple different housings (e.g., be remotely located).

The at least one processor 1810 may be any means configured to execute various programmed operations or instructions stored in a memory device (e.g., memory 1820) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the at least one processor 1810 as described herein. In this regard, the at least one processor 1810 may be configured to analyze electrical signals communicated thereto to provide or receive sonar data from one or more sonar devices and additional (e.g., secondary) data from other sources.

In some embodiments, the at least one processor 1810 may be further configured to implement signal processing. In some embodiments, the at least one processor 1810 may be configured to perform enhancement features to improve the display characteristics of data or images, collect or process additional data, such as time, temperature, GPS information, waypoint designations, or others, or may filter extraneous data to better analyze the collected data. The at least one processor 1810 may further implement notices and alarms, such as those determined or adjusted by a user, to reflect proximity of other vehicles (e.g. watercraft), proximity of areas of interest, proximity of areas that have a high number of fish, approaching storms, etc. In some embodiments, the at least one processor 1810 may receive data from different sonar transducer arrays and compile the sonar data into a single sonar image as depicted in FIG. 14B.

In an example embodiment, the memory 1820 may include one or more non-transitory storage or memory devices such as, for example, volatile and/or non-volatile memory that may be either fixed or removable. The memory 1820 may be configured to store instructions, computer program code, sonar data, and additional data such as radar data, chart data, location/position data in a non-transitory computer readable medium for use, such as by the at least one processor 1810 for enabling the marine electronic device 1805 to carry out various functions in accordance with example embodiments of the present invention. For example, the memory 1820 could be configured to buffer input data for processing by the at least one processor 1810. Additionally or alternatively, the memory 1820 could be configured to store instructions for execution by the at least one processor 1810.

The communication interface 1830 may be configured to enable communication to external systems (e.g. an external network 1802). In this manner, the marine electronic device 1805 may retrieve stored data from a remote device 1861 via the external network 1802 in addition to or as an alternative to the onboard memory 1820. Additionally or alternatively, the marine electronic device 1805 may transmit or receive data, such as sonar signal data, sonar return data, sonar image data, path data or the like to or from a transducer assembly 1862. In some embodiments, the marine electronic device 1805 may also be configured to communicate with other devices or systems (such as through the external network 1802 or through other communication networks, such as described herein). For example, the marine electronic device 1805 may communicate with a propulsion system of the watercraft 100 (e.g., for autopilot control); a remote device (e.g., a user's mobile device, a handheld remote, etc.); or another system.

The communications interface 1830 of the marine electronic device 1805 may also include one or more communications modules configured to communicate with one another in any of a number of different manners including, for example, via a network. In this regard, the communications interface 1830 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or transducer assemblies) may be included in the system 1800.

The position sensor 1845 may be configured to determine the current position and/or location of the marine electronic device 1805 (and/or the watercraft 100). For example, the position sensor 1845 may comprise a GPS, bottom contour, inertial navigation system, such as machined electromagnetic sensor (MEMS), a ring laser gyroscope, or other location detection system. Alternatively or in addition to determining the location of the marine electronic device 1805 or the watercraft 100, the position sensor 1845 may also be configured to determine the position and/or orientation of an object outside of the watercraft 100.

The display 1840 (e.g. one or more screens) may be configured to present images and may include or otherwise be in communication with a user interface 1835 configured to receive input from a user. The display 1840 may be, for example, a conventional LCD (liquid crystal display), a touch screen display, mobile device, or any other suitable display known in the art upon which images may be displayed.

In some embodiments, the display 1840 may present one or more sets of data (or images generated from the one or more sets of data). Such data includes chart data, sonar data, radar data, weather data, location data, position data, orientation data, or any other type of information relevant to the watercraft. Sonar data may be received by transducer arrays 1867, 1868, 1869. Radar data may be received from a radar device on the watercraft or from radar devices positioned at other locations, such as remote from the watercraft. Additional data may be received from marine devices such as a primary motor or an associated sensor, a trolling motor or an associated sensor, an autopilot, a rudder or an associated sensor, a position sensor 1845, a direction sensor, a remote device 1861, onboard memory 1820 (e.g., stored chart data, historical data, etc.), or other devices.

In some further embodiments, various sets of data, referred to above, may be superimposed or overlaid onto one another. For example, sonar data generated by one transducer array 1867 may be applied to (or overlaid onto) a chart alongside sonar data generated by other transducer arrays 1868, 1869. Additionally or alternatively, other information such as depth information, weather information, radar information, sonar information, or any other navigation system inputs may be provided on a single display with or without sonar data also presented.

The user interface 1835 may include, for example, a keyboard, keypad, function keys, mouse, scrolling device, input/output ports, touch screen, or any other mechanism by which a user may interface with the system.

Although the display 1840 of FIG. 18 is shown as being directly connected to the at least one processor 1810 and within the marine electronic device 1805, the display 1840 could alternatively be remote from the at least one processor 1810 and/or marine electronic device 1805. Likewise, in some embodiments, the position sensor 1845 and/or user interface 1835 could be remote from the marine electronic device 1805.

The marine electronic device 1805 may include one or more other sensors/devices 1847, such as configured to measure or sense various other conditions. The other sensors/devices 1847 may include, for example, an air temperature sensor, a water temperature sensor, a current sensor, a light sensor, a wind sensor, a speed sensor, or the like.

The transducer assembly 1862 illustrated in FIG. 18 includes three transducer arrays 1867, 1868, 1869. In some embodiments, more or less transducer arrays could be included, or other transducer elements could be included. For example, FIG. 19 illustrates an embodiment where only a single transducer array 1867' is included (all other features in FIG. 19 are similar to FIG. 18).

As indicated herein, the transducer assembly 1862 may also include a sonar signal processor or other processor (although not shown) configured to perform various sonar processing. In some embodiments, the processor (e.g., at least one processor 1810 in the marine electronic device 1805, a controller (or processor portion) in the transducer assembly 1862, or a remote controller—or combinations thereof) may be configured to filter sonar return data and/or selectively control transducer elements of the transducer array 1867. For example, various processing devices (e.g., a multiplexer, a spectrum analyzer, A-to-D converter, etc.) may be utilized in controlling or filtering sonar return data and/or transmission of sonar signals from the transducer array 1867.

The transducer assembly 1862 may also include one or more other systems, such as various sensor(s) 1866. For example, the transducer assembly 1862 may include an orientation sensor, such as gyroscope or other orientation sensor (e.g., accelerometer, MEMS, etc.) that can be configured to determine the relative orientation of the transducer assembly 1862 and/or the one or more arrays 1867—such as with respect to a forward direction of the watercraft. In some embodiments, additionally or alternatively, other types of sensor(s) are contemplated, such as, for example, a water temperature sensor, a current sensor, a light sensor, a wind sensor, a speed sensor, or the like.

The components presented in FIGS. 18 and 19 may be rearranged to alter the connections between components. For example, in some embodiments, a marine device outside of the marine electronic device 1805, such as a radar, may be directly connected to the at least one processor 1810 rather than being connected to the communication interface 1830. Additionally, sensors and devices implemented within the marine electronic device 1805 may be directly connected to the communications interface in some embodiments rather than being directly connected to the at least one processor 1810.

Example Flowchart(s) and Operations

Some embodiments of the present invention provide methods, apparatus, and systems related to the introduction of a horn to reform the beam shape generated by a sonar transducer element or array. By performing these methods, the beam shape generated by the sonar transducer element or array may be improved by providing more consistent signal intensities despite changes in the angle or operating frequency.

FIG. 20 illustrates a flowchart of an example method of operating a sonar system with a horn according to some embodiments discussed herein. A sonar transducer array having an emitting face is provided at operation 2002. At operation 2004, a horn is provided. This horn may have two or more diffraction surfaces. These diffraction surfaces may possess a curved and convex shape, and the horn may be configured so that the diffraction surfaces may rest within the beam path of a sonar transducer element as illustrated in FIG. 2D. The horn may be provided within a path of a sonar beam generated by the emitting face, and the horn may be configured to reform a beam shape of the sonar beam generated by the emitting face.

At operation 2006, the horn may be positioned in the signal path of the sonar transducer array. In this way, any sonar beams generated by the sonar transducer array may be reformed to provide improved beam shapes as discussed above. At operation 2008, emission of a sonar beam from the emitting face into the path may be caused, and this may be done by sending a signal, actuating a switch, etc.

The operations of FIG. 20 may be performed in any order unless otherwise noted, and additional operations may be performed or certain operations may be omitted.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A system for reforming sonar emissions from a sonar transducer element or an array of sonar transducer elements, the system comprising:

the sonar transducer element or the array of sonar transducer elements, wherein the sonar transducer element or the array of sonar transducer elements define an emitting face, and wherein the sonar transducer element or the array of sonar transducer elements are configured to transmit sonar signals along one or more paths; and a horn comprising at least one surface, wherein the at least one surface is positioned adjacent to or in a spaced apart manner from the emitting face of the sonar transducer element or the array of sonar transducer elements and extends into the one or more paths so that the at least one surface is positioned at least partially in the one or more paths such that at least some of the sonar signals transmitted from the sonar transducer element or the array of sonar transducer elements are redirected based on interaction of the at least some of the sonar signals and the at least one surface.

2. The system of claim 1, wherein the horn is configured to expand the field of view of the sonar transducer element or the array of sonar transducer elements in at least one dimension.

3. The system of claim 2, wherein the sonar signals are emitted from the sonar transducer element or the array of sonar transducer elements with a transverse beam width and a longitudinal beam width, and wherein the horn is configured to expand the transverse beam width.

4. The system of claim 2, wherein the horn is configured to provide an intensity of over −20 dB for a field of view of 60 degrees.

5. The system of claim 4, wherein the horn is configured to provide an intensity of over −20 dB for a field of view of 60 degrees when the sonar transducer element or the array of sonar transducer elements are operating at a frequency of 950 kHz.

6. The system of claim 4, wherein the sonar transducer element or the array of sonar transducer elements are secured to a watercraft and are configured to provide sonar return data corresponding to a side-scan image.

7. The system of claim 1, wherein the sonar transducer element or the array of sonar transducer elements are configured to operate at a frequency between 400 kHz and 1300 kHz.

8. The system of claim 1, wherein the at least one surface comprises at least two diffraction surfaces, wherein the at least two diffraction surfaces are each curved, convex surfaces that are positioned opposite each other, and wherein each of the curved, convex surfaces are configured to protrude toward each other and into the path of the at least some of the sonar signals.

9. The system of claim 1, wherein the horn is configured to be secured adjacent to the emitting face so that the horn abuts the emitting face.

10. The system of claim 1, wherein the horn is configured to be secured at a distance away from the emitting face.

11. The system of claim 1, comprising a plurality of horns, wherein each horn of the plurality of horns is configured to rest within a respective path of the one or more paths.

12. The system of claim 1, wherein the sonar transducer element or the array of sonar transducer elements comprise a first sonar transducer array with a corresponding first horn, wherein the system further comprises a second sonar transducer array with a corresponding second horn, wherein the first sonar transducer array has a first emitting face and the second sonar transducer array has a second emitting face, and wherein the first emitting face of the first sonar transducer array and the second emitting face of the second sonar transducer array are oriented in different directions.

13. The system of claim 12, further comprising a processor configured to:
receive first sonar return data from the first sonar transducer array and second sonar return data from the second sonar transducer array, wherein the first sonar return data is formed utilizing frequency steering, and wherein the second sonar return data is formed utilizing frequency steering; and
generate a sonar image comprising:
a first portion that is formed based on the first sonar return data from the first sonar transducer, wherein the first portion comprises a first end and a second end, wherein the first sonar return data varies in frequency leading from the first end to the second end, and wherein a first frequency of the first sonar return data proximate the first end is lower than a second frequency proximate the second end; and
a second portion that is formed based on the second sonar return data from the second sonar transducer, wherein the second portion comprises a first end and a second end, wherein the second sonar return data varies in frequency leading from the first end to the second end, wherein a first frequency of the second sonar return data proximate the first end is lower than a second frequency proximate the second end,
wherein the first portion is adjacent to the second portion such that the first end of the first portion is adjacent to the second end of the second portion, wherein the first frequency of the first sonar return data is different than the second frequency of the second sonar return data such that there is a frequency disparity between the first end of the first portion and the second end of the second portion,
wherein the first horn is configured to redirect at least some of the sonar signals corresponding to at least the first frequency of the first sonar return data and wherein the second horn is configured to redirect at least some of the sonar signals corresponding to at least the second frequency of the second sonar return data to cause a smooth transition in the sonar image between the first end of the first portion and the second end of the second portion.

14. The system of claim 1, wherein the at least one surface is positioned relative to the emitting face of the sonar transducer element or the array of sonar transducer elements such that the at least one surface at least partially redirects the at least some of the sonar signals emitted from the sonar transducer element or the array of sonar transducer elements before any other surface.

15. A horn for controlling sonar beam shapes, comprising:
at least one surface,
wherein the at least one surface of the horn is configured to be positioned to extend at least partially into a path of a sonar beam generated by a sonar transducer element or an array of sonar transducer elements so as to at least partially reform at least some sonar signals transmitted from the sonar transducer element or the array of sonar transducer elements based on interaction of the at least some of the sonar signals and the at least one surface.

16. The horn of claim 15, wherein the horn comprises rubber material.

17. The horn of claim 15, wherein the horn comprises a soft closed-cell foam rubber sheet.

18. The horn of claim 15, wherein the at least one surface is a curved surface.

19. The horn of claim 15, wherein the horn is configured to expand a field of view of the sonar transducer element or the array of sonar transducer elements in at least one dimension.

20. A method for operating a sonar system, the method comprising:
providing a sonar transducer element or an array of sonar transducer elements, wherein the sonar transducer element or the array of sonar transducer elements define an emitting face, and wherein the sonar transducer element or the array of sonar transducer elements are configured to transmit sonar signals along one or more paths;
providing a horn comprising at least one surface, wherein the at least one surface is positioned adjacent to or in a spaced apart manner from the emitting face of the sonar transducer element or the array of sonar transducer elements and extends into the one or more paths so that the at least one surface is positioned at least partially in the one or more paths such that at least some of the sonar signals transmitted from the sonar transducer element or the array of sonar transducer elements are reformed based on interaction of the at least some of the sonar signals and the at least one surface; and causing emission of the sonar signals from the emitting face into the one or more paths.

* * * * *